United States Patent
Tone

(10) Patent No.: US 7,916,975 B2
(45) Date of Patent: Mar. 29, 2011

(54) IMAGE PROCESSING APPARATUS AND IMAGE PROCESSING CONTROL METHOD

(75) Inventor: Takeharu Tone, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 995 days.

(21) Appl. No.: 11/621,771

(22) Filed: Jan. 10, 2007

(65) Prior Publication Data

US 2007/0159664 A1    Jul. 12, 2007

(30) Foreign Application Priority Data

Jan. 12, 2006  (JP) .................... 2006-004366

(51) Int. Cl.
*G06K 9/54* (2006.01)
*H04N 1/32* (2006.01)
(52) U.S. Cl. ........................ 382/305; 358/468
(58) Field of Classification Search .............. 382/173, 382/254, 274, 303–305, 312; 358/1.16, 1.2, 358/400, 500, 468; 348/222.1, 223.1; 712/1, 712/220; 718/101–102
See application file for complete search history.

(56) References Cited

U.S. PATENT DOCUMENTS

| | | | | |
|---|---|---|---|---|
| 4,074,361 A | * | 2/1978 | Clow | 708/191 |
| 5,171,393 A | * | 12/1992 | Moffat | 156/345.32 |
| 5,404,520 A | * | 4/1995 | Sonobe | 718/101 |
| 5,715,070 A | | 2/1998 | Tone et al. | |
| 6,947,047 B1 | * | 9/2005 | Moy et al. | 345/501 |
| 6,961,084 B1 | * | 11/2005 | Duncan et al. | 348/222.1 |
| 7,076,641 B2 | * | 7/2006 | Fujiwara et al. | 712/244 |

FOREIGN PATENT DOCUMENTS

| | | |
|---|---|---|
| EP | 0 440 806 A1 * | 8/1991 |
| JP | 3-205985 | 9/1991 |
| JP | 8-274986 | 10/1996 |
| JP | 11-53526 | 2/1999 |
| JP | 2000-99712 | 4/2000 |

OTHER PUBLICATIONS

Office Action issued Sep. 8, 2010, in Japan Patent Application No. 2006-004366.

* cited by examiner

*Primary Examiner* — Kanji Patel
(74) *Attorney, Agent, or Firm* — Oblon, Spivak, McClelland, Maier & Neustadt, L.L.P.

(57) ABSTRACT

An image processing apparatus capable of regulating memory increase to realize cost reduction while securing the degree of freedom in programming by means of a small-sized programmable data processing section, and thereby improving processing performance. A programmable data processing section comprises two processing sections capable of performing different processings simultaneously. Each of the processing sections repeatedly executes the steps of: reading image data from an image data storage section; reading mutually different processing programs from a processing program storage section; executing a predetermined processing in parallel on the image data; and returning the processed image data to the image data storage section.

17 Claims, 26 Drawing Sheets

EXAMPLE OF SYSTEM CONFIGURATION OF PRESENT INVENTION

EXAMPLE OF CONVENTIONAL SYSTEM (SOFTWARE TYPE)

SCHEMATIC DIAGRAM OF PROCESSING OF PRESENT INVENTION

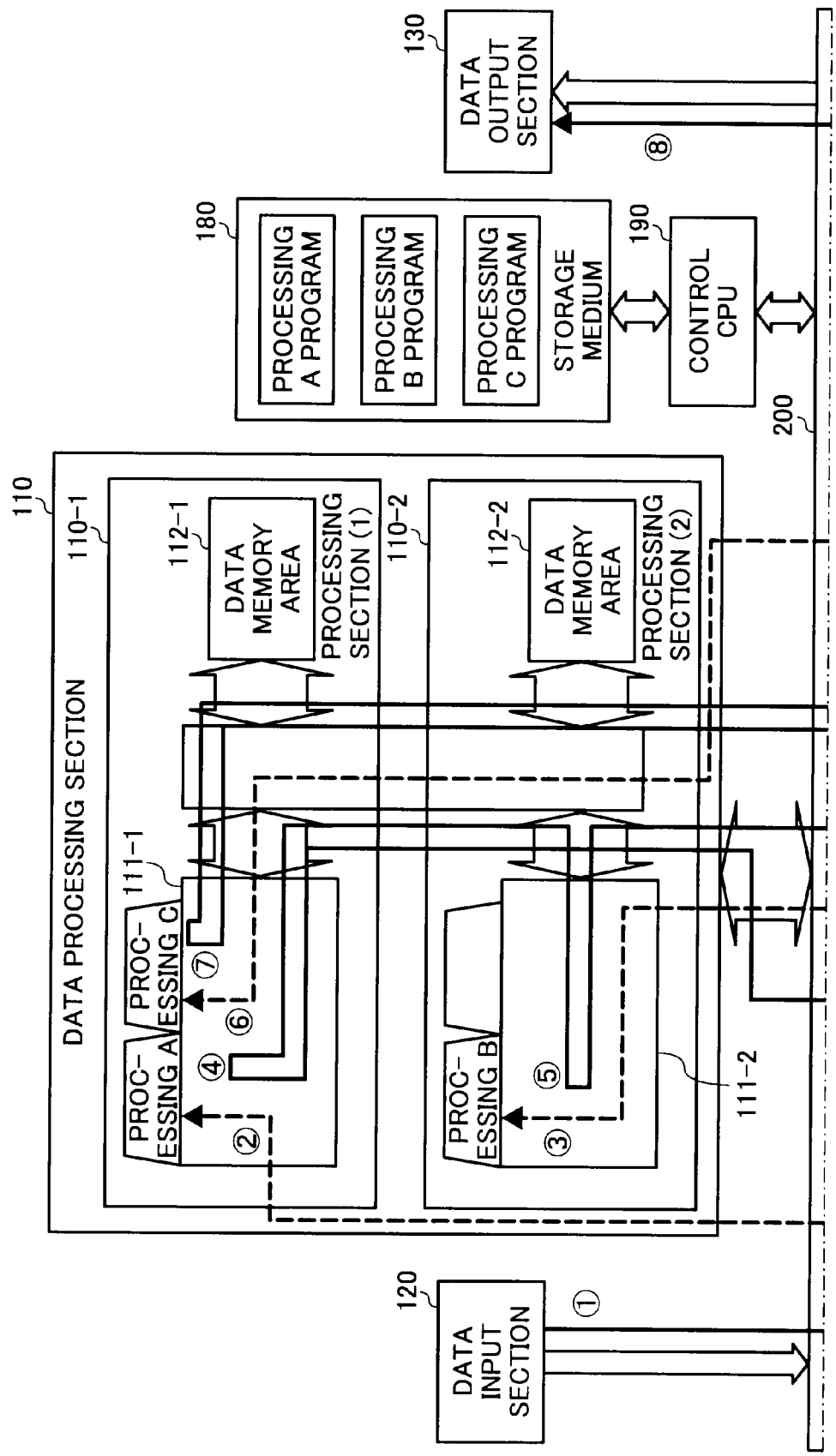

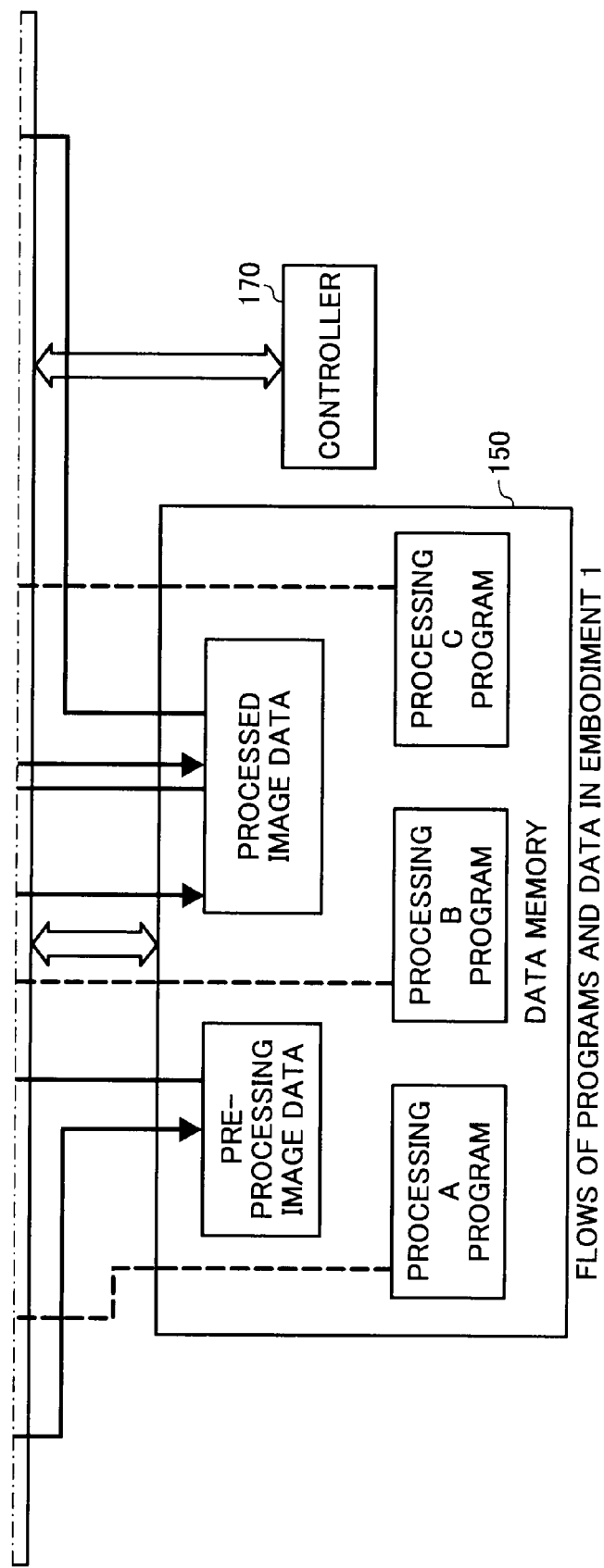

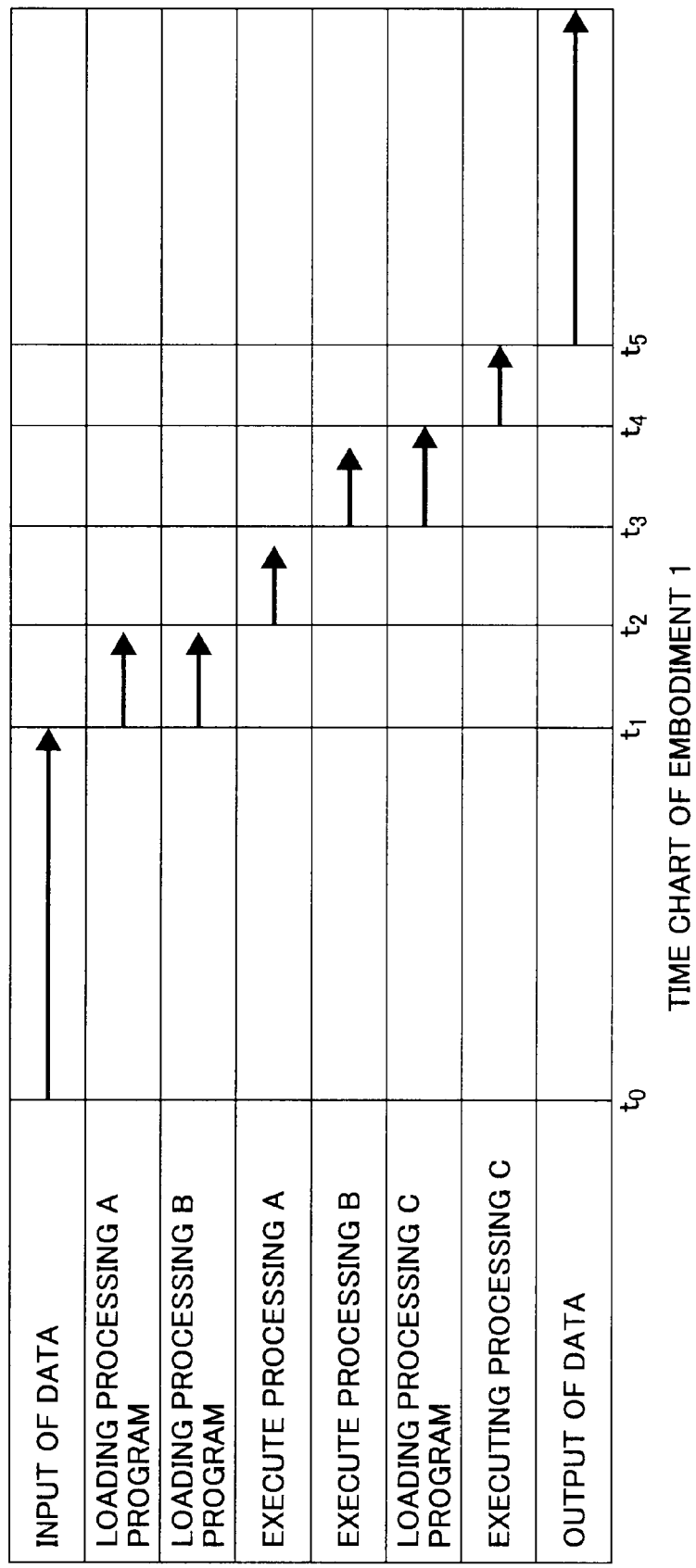

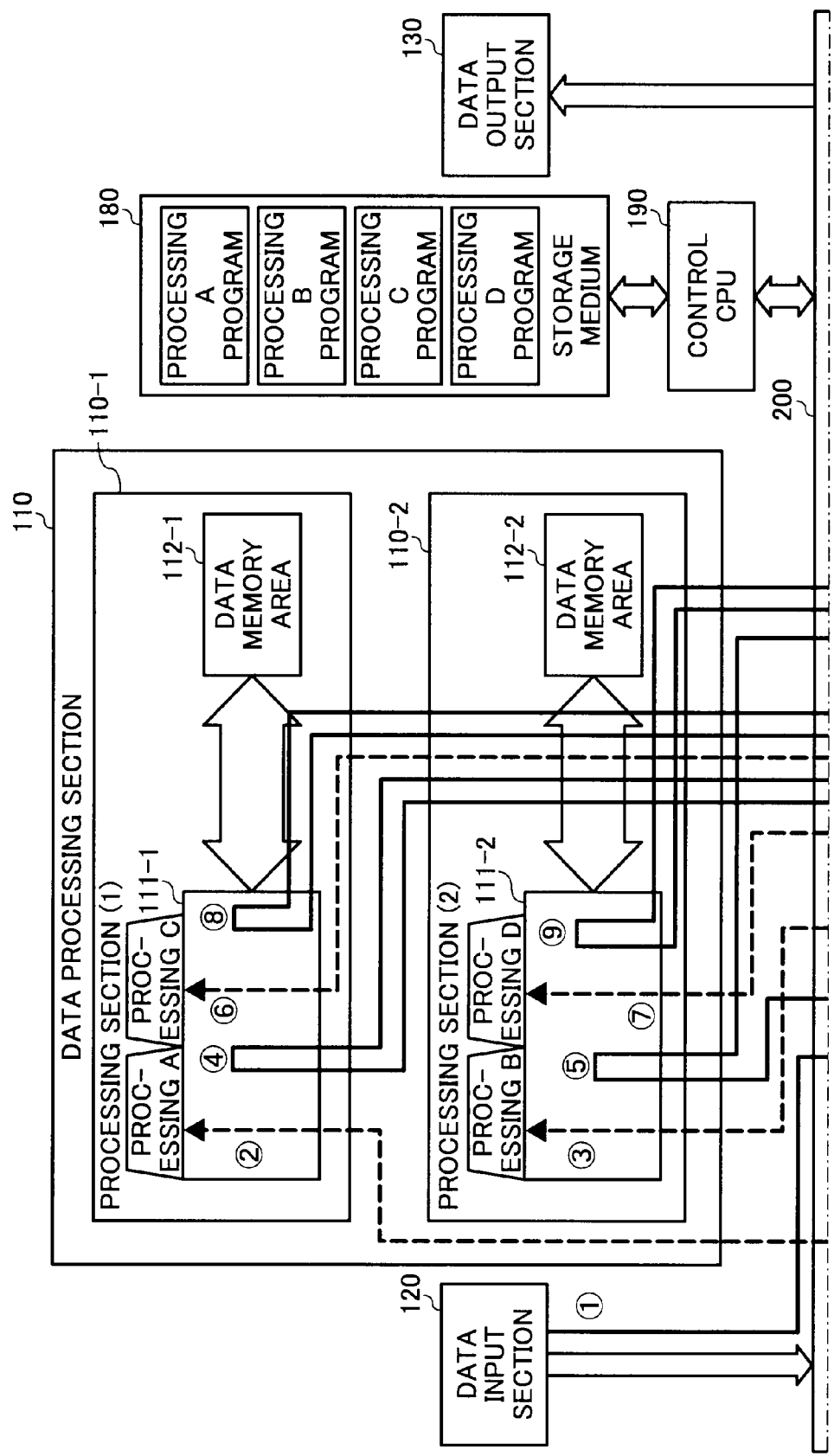

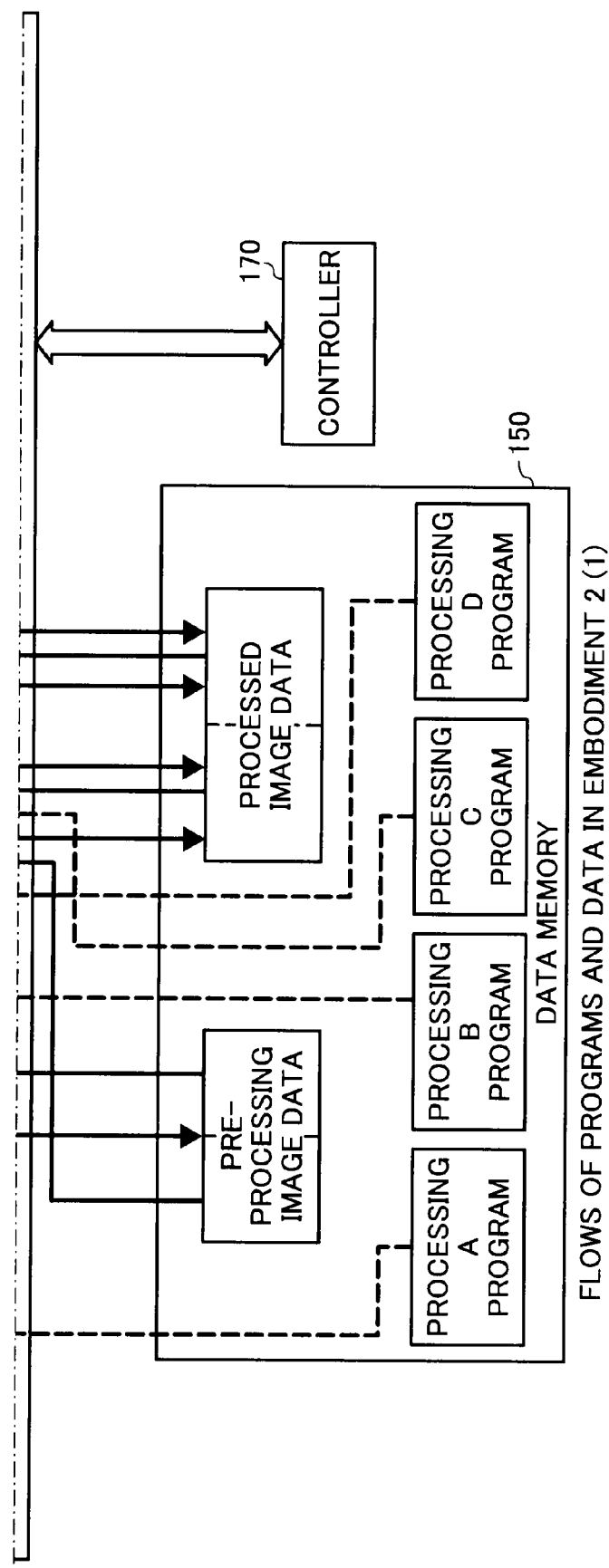

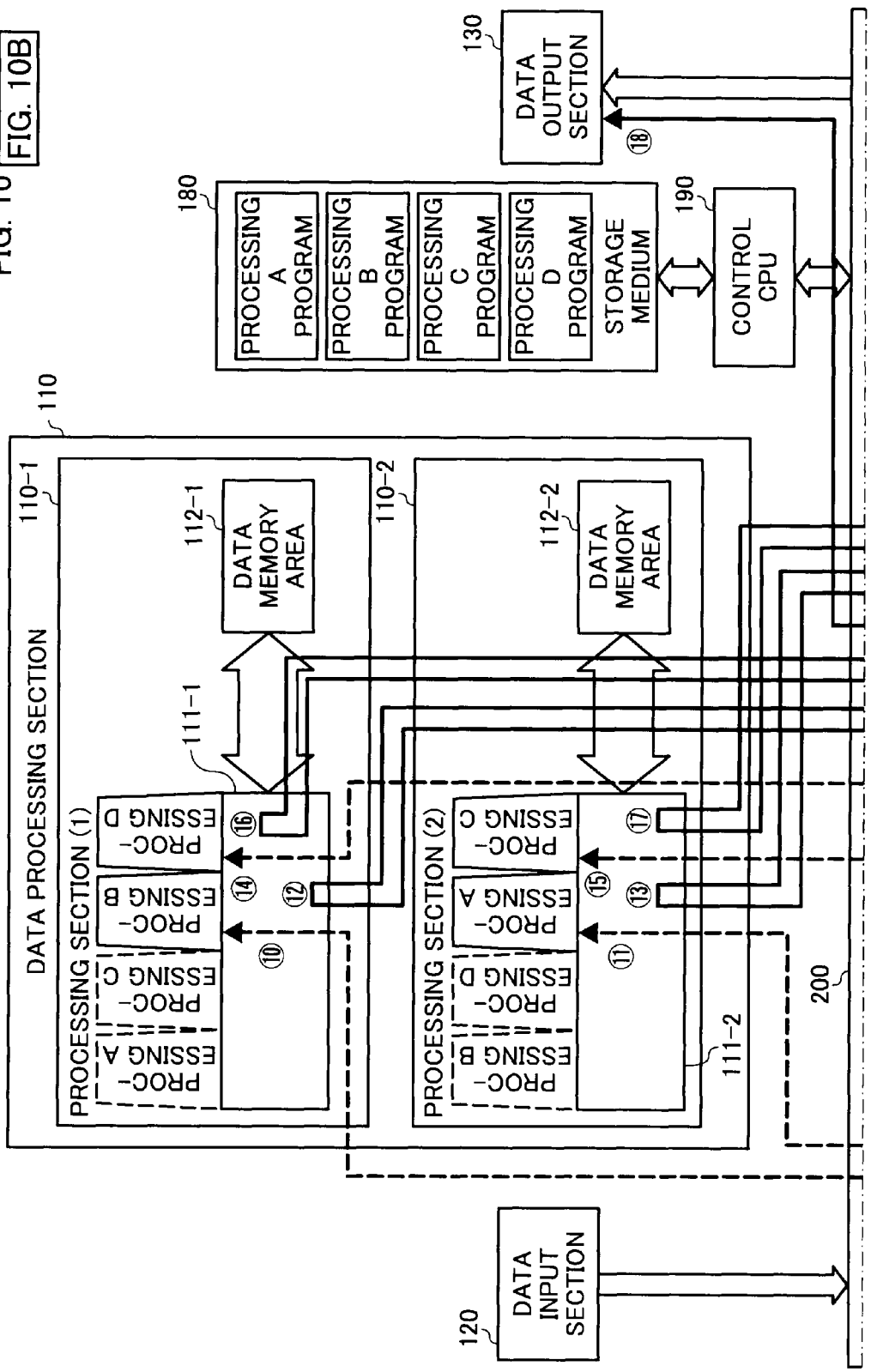

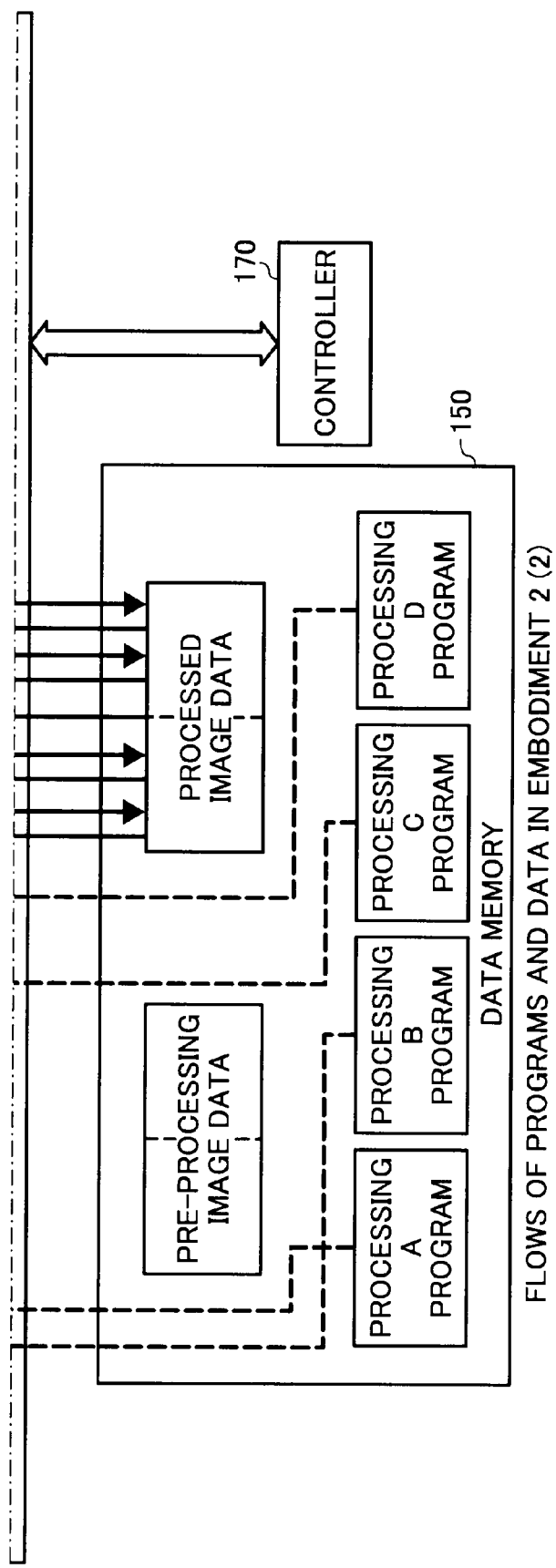

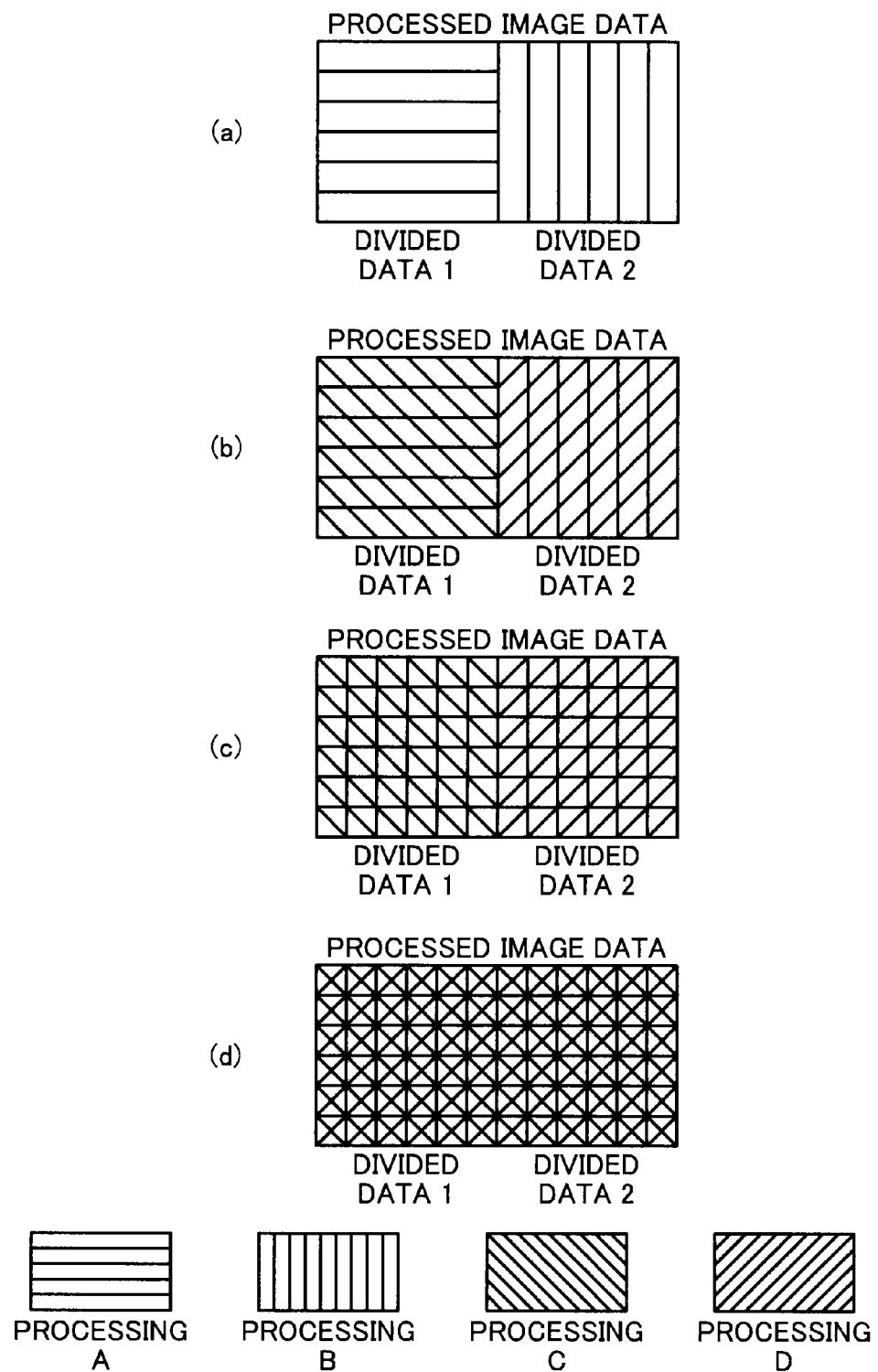

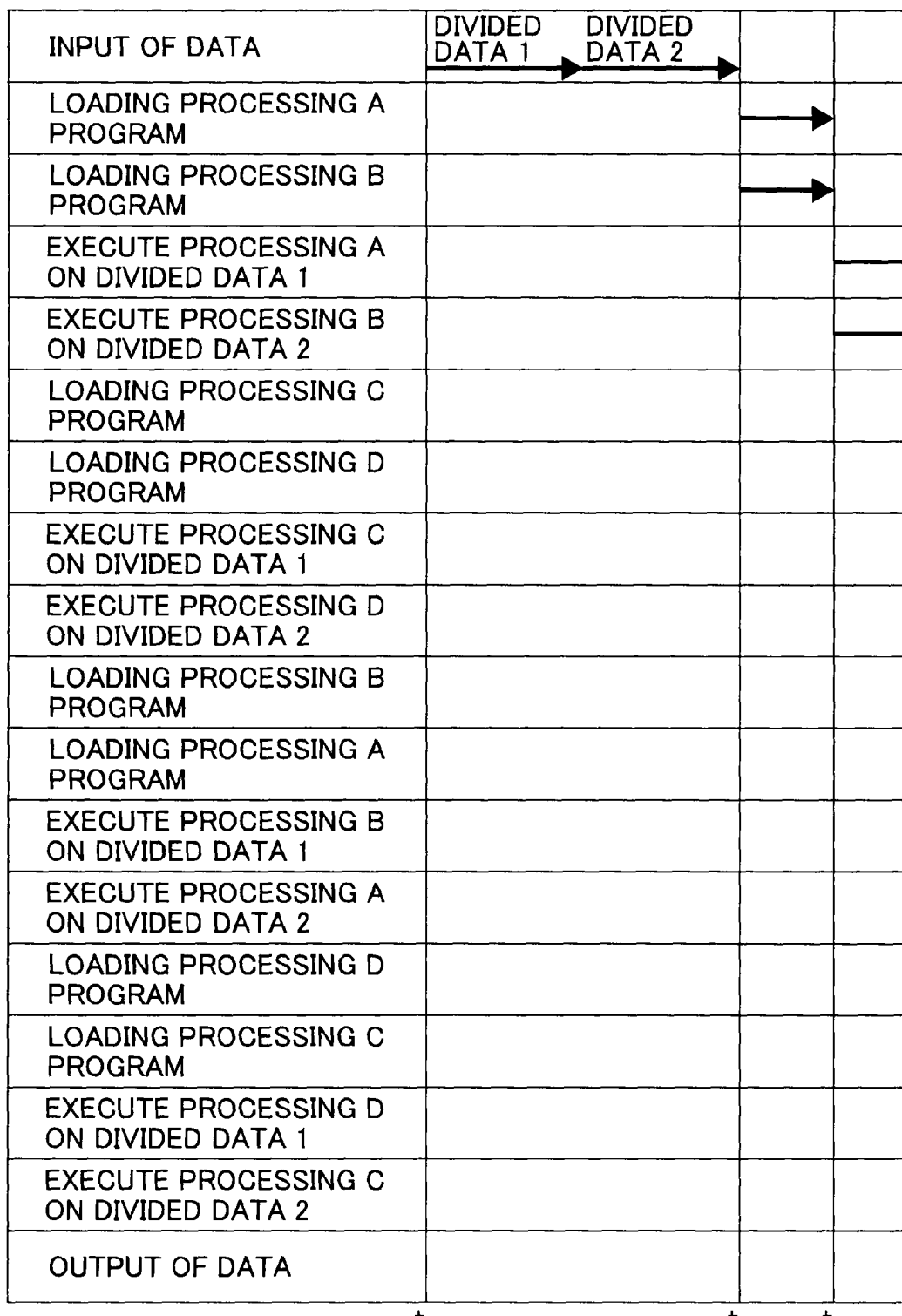
FIG. 12A    FIG. 12 | FIG. 12A / FIG. 12B

TIME CHART OF EMBODIMENT 2

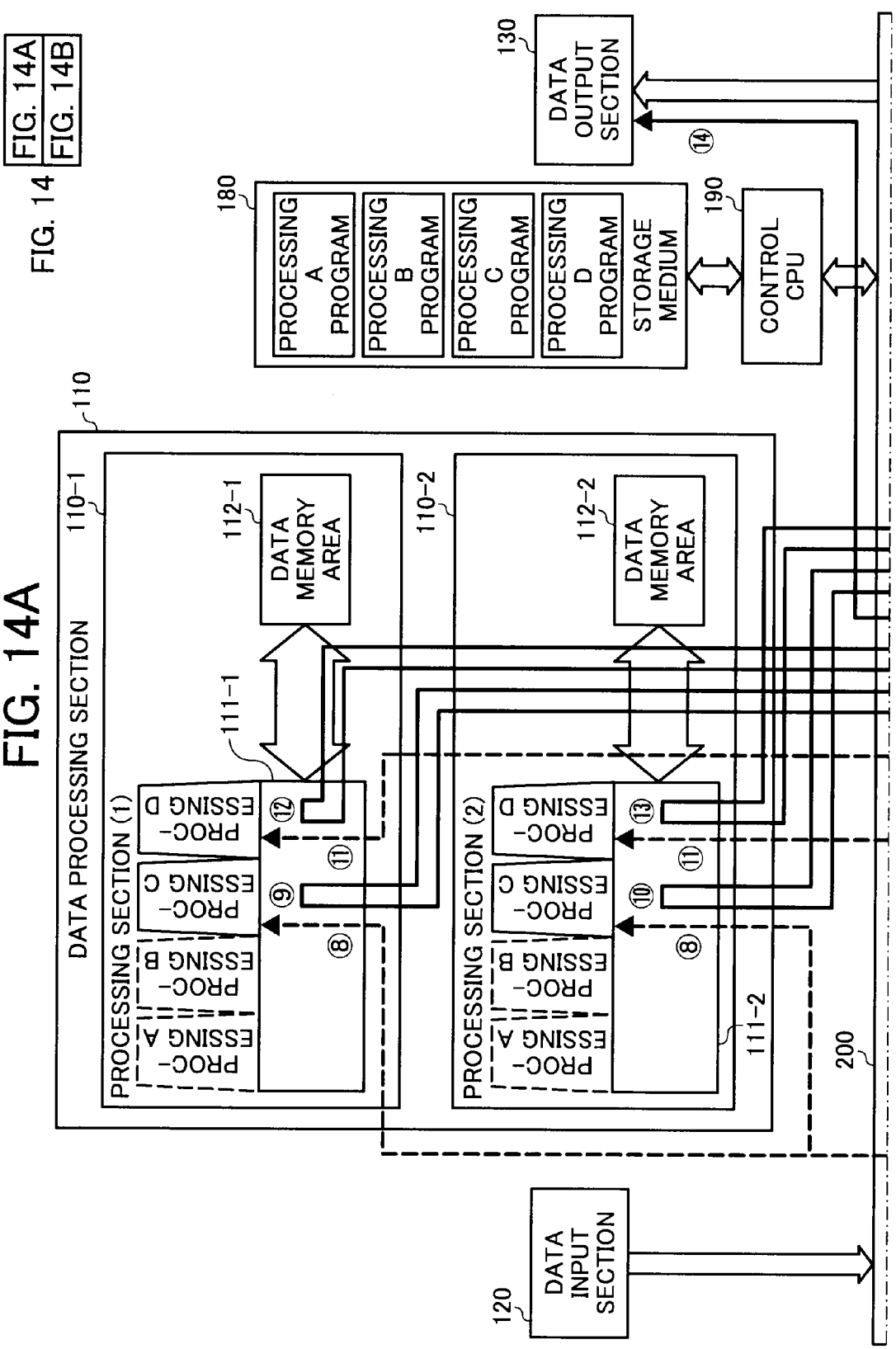

TIME CHART OF EMBODIMENT 3

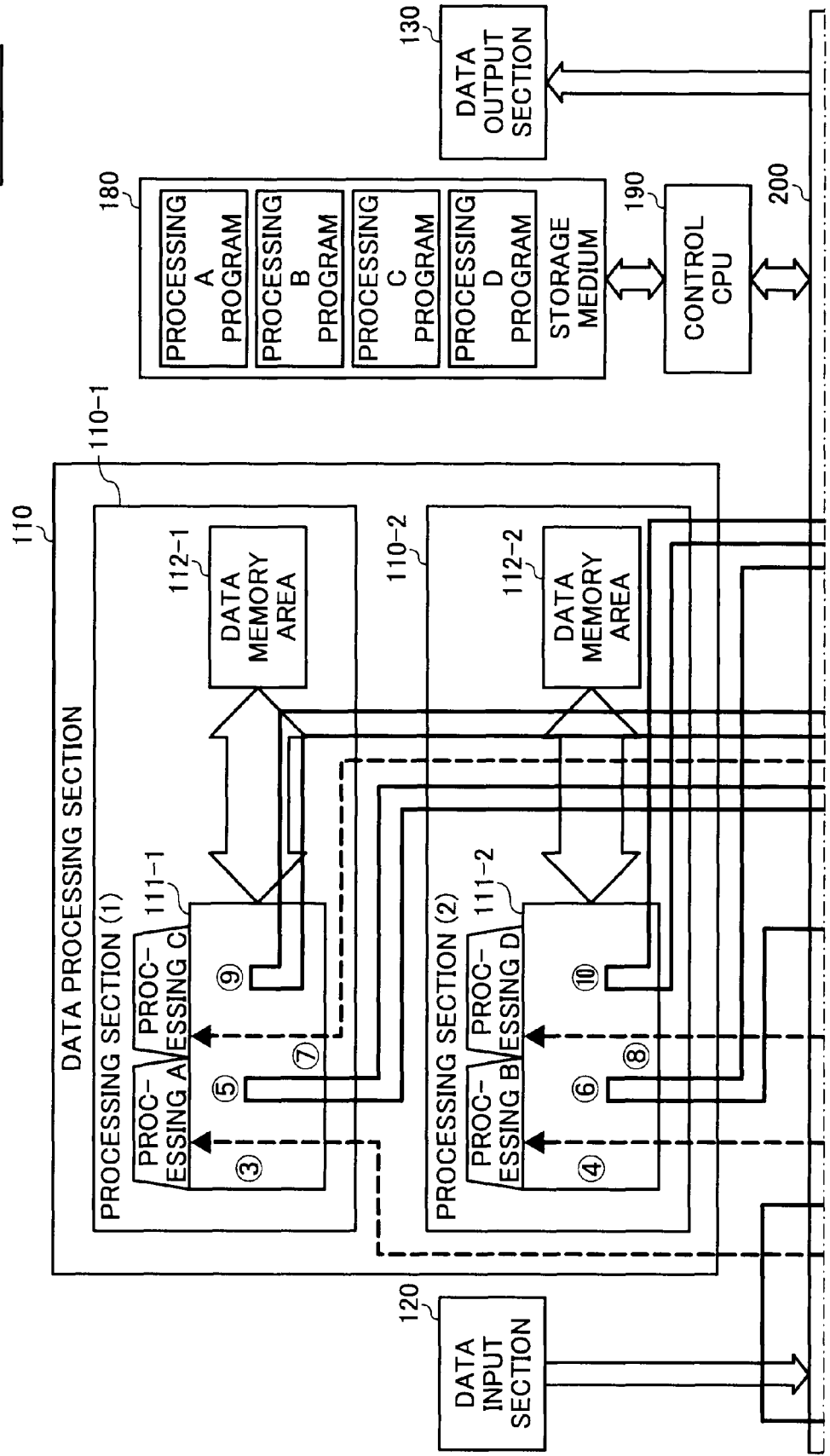

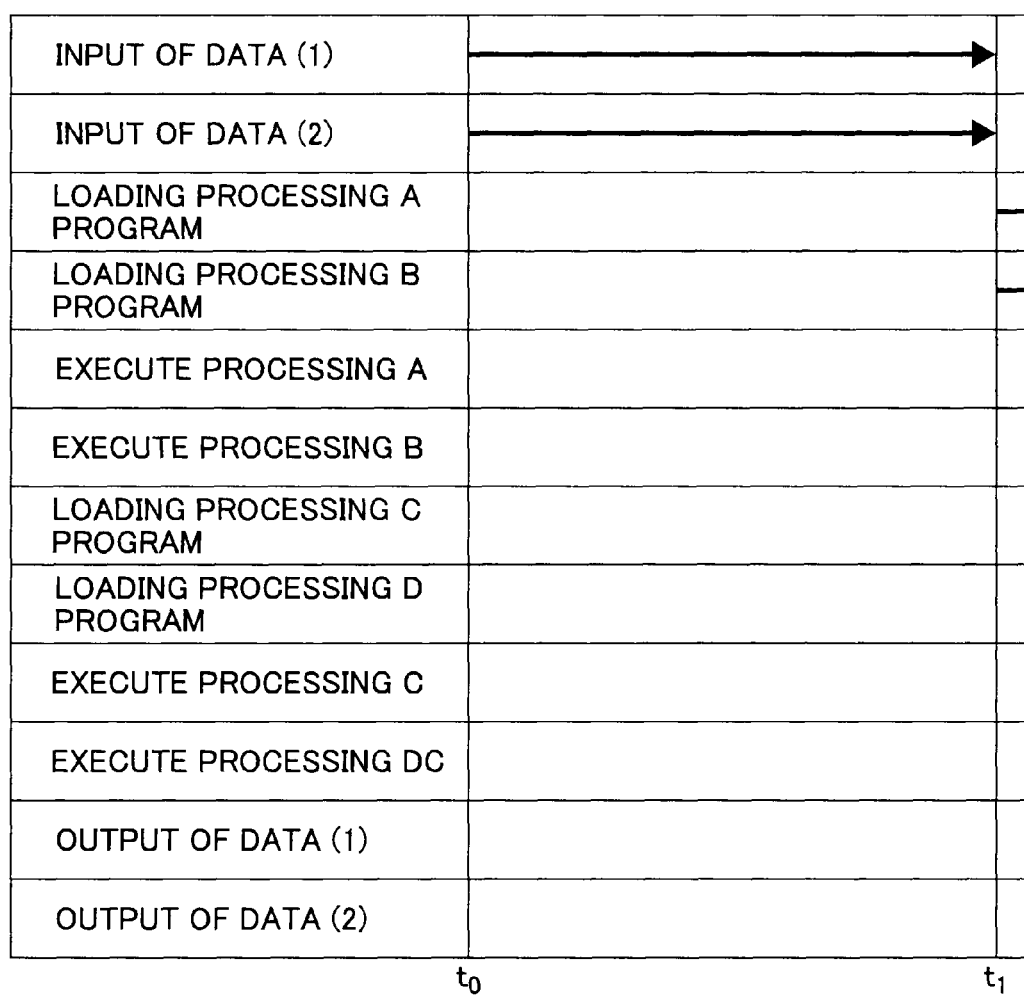

TIME CHART OF EMBODIMENT 4

IMAGE PROCESSING APPARATUS AND IMAGE PROCESSING CONTROL METHOD

BACKGROUND OF THE INVENTION

1. Field of the Invention

The present invention relates to an image processing apparatus and image processing control method that are applied in a digital copying machine, facsimile device, a printer or other devices, a complex machine (MFP) having a combination of some or all of the processing functions of these devices or a scanner, and other image data processing devices.

2. Description of the Background Art

In an image processing apparatus such as a digital copying machine, processing functions for, for example, line-to-line correction, shading correction, MTF (spatial frequency characteristic) filtering, gamma conversion and gradation processing are required. Furthermore, in a complex machine (MFP), a copy function, scanner function, facsimile function, printer function and the like are required in one image processing apparatus.

In a conventional image processing apparatus, generally a plurality of processing functions are realized by using data processing hardware (ASIC) having a plurality of independent dedicated processing sections, as described in, for example, Japanese Patent Application Laid-Open No. H8-274986 or U.S. patent application Ser. No. 5,715,070. An advantage of using such data processing hardware having a plurality of dedicated processing sections is that speed performance is excellent. However, since this hardware is designed in hard logic, a disadvantage is that it lacks flexibility in changing and adding functions. As a solution to this problem, sometimes a programmable device such as a DSP (digital signal processor) is used. An advantage of using a programmable device such as a DSP is that it can deal with flexibility in changing/adding processing functions by downloading again a processing program inside the DSP. However, since this programmable device is used for software processing, a disadvantage is that it lacks speed performance, compared to dedicated hard logic. Moreover, a processing program memory and processing data memory are required in the conventional programmable device as much as the number of processes to be performed, thus such programmable device has another disadvantage of high expense.

The image processing apparatus for an ASIC and the image processing apparatus for DSP have advantages and disadvantages as described above, thus they are used separately.

On the other hand, in a recent complex machine (MFP), the process flows are diversified and complicated because of the enhanced copy function, scanner function, facsimile function, printer function and the like thereof. The reason is that various processing functions need to be installed in order to respond to various user requests. Furthermore, because of strong user requests for image performance, the number of image processes tends to increase in order to obtain high-quality pictures. It should be noted that diversity and complexity of the process flows can also be said in, not only the complex machine, but also devices such as a digital copying machine, facsimile device and printer, and other image data processing devices.

For this reason, there is a problem that the hardware section for actually performing image processing, such as an ASIC, is enlarged, increasing the production cost. Especially, the data processing hardware such as an ASIC is configured in which a plurality of dedicated blocks for processing and dedicated memories for processing are disposed as much as the number of required processing functions in the hardware, as described above, thus it is difficult to reduce the cost while maintaining the required processing functions. Moreover, dedicated hardware logic is constituted inside of the hardware beforehand to realize the processing functions, thus a fundamental problem is that this hardware lacks flexibility in subsequent changing and adding the processes.

Moreover, although the programmable device such as a DSP is not as excellent as the ASIC in terms of the speed performance and costs, the largest advantage thereof is the high degree of freedom that the functions can be programmed freely to respond to each user request. Specifically, changing and adding processes can be realized easily by programming a desired processing function and downloading the program code to the DSP or the like. However, in the conventional image processing apparatus using the programmable device such as a DSP, program memories and data memories are required as much as the number of processes when executing a plurality of processing functions, as described above, thus the problem is that the size of the DSP or the like is enlarged, further increasing the costs, compared to the ASIC and the like. Also, required capacity of the data memory tends to increase more and more as the image data expands, thus the cost increase is inevitable.

SUMMARY OF THE INVENTION

An object of the present invention is to provide an image processing apparatus and image processing control method for regulating memory increase to realize cost reduction, while securing the degree of freedom in programming, and for improving processing performance.

In an aspect of the present invention, an image processing apparatus comprises a programmable data processing section; an image data storage section; and a processing program storage section storing a plurality of processing programs. The data processing section comprises a plurality of processing sections in which processings can be performed simultaneously. Each of the plurality of processing sections repeats the steps of: reading the image data from the image data storage section; reading the processing programs from the processing program storage section; executing the read processing programs in parallel on the read image data; and returning the processed image data to the image data storage section.

In another aspect of the present invention, an image processing control method for an image processing apparatus which comprises a programmable data processing section having a plurality of processing sections which can perform processings simultaneously, an image data storage section, and a processing program storage section storing a plurality of processing programs. Each of the plurality of processing sections repeats the steps of reading the image data from the image data storage section; reading the processing programs from the processing program storage section; executing the read processing programs in parallel on the read image data; and returning the processed image data to the image data storage section.

BRIEF DESCRIPTION OF THE DRAWINGS

The above and other objects, features and advantages of the present invention will become more apparent from the following detailed description taken with the accompanying drawings in which:

FIG. 7 is a figure showing flows of programs and data according to Embodiment 1 of the present invention;

FIG. 8 is a figure showing a time chart of Embodiment 1;

FIG. 9 is a figure showing flows of programs and data according to Embodiment 2 of the present invention;

FIG. 10 is a figure showing the continuation of the flows of programs and data according to Embodiment 2;

FIG. 11 is a figure showing a transition of processed image data inside a data memory of Embodiment 2;

DESCRIPTION OF THE PREFERRED EMBODIMENTS

Before explaining the present invention, the conventional technology and problems thereof are described.

Figure 1:
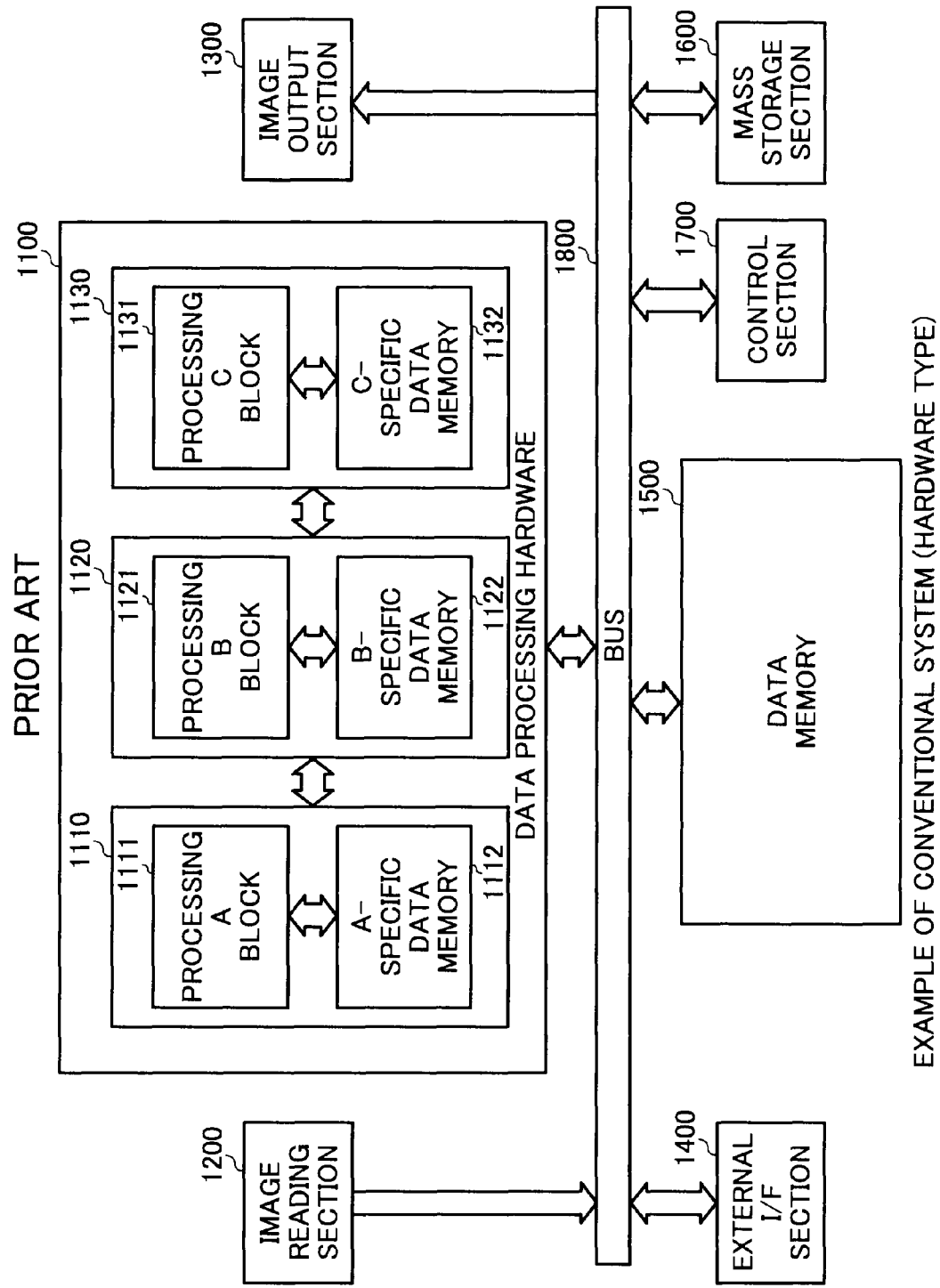
FIG. 1 is a figure showing a system configuration of an image processing apparatus using a conventional ASIC.

FIG. 1 shows an example of a system configuration of an image processing apparatus using data processing hardware that has a plurality of conventional dedicated processing sections. In FIG. 1, for simplification, the data processing hardware (ASIC) 1100 is constituted by three independent dedicated hardware processing sections 1110, 1120 and 1130, but generally the data processing hardware has more processing sections. Here, the processing section 1110 is constituted by a processing block (processing A block) 1111 for executing processing A on an image, and a data memory 1112 dedicated to the processing block (A-specific data memory). Similarly, the processing section 1120 is constituted by a processing B block 1121 and a B-specific data memory 1122, and the processing section 1130 is constituted by a processing C block 1131 and a C-specific data memory 1132. Moreover, the processing sections 1110, 1120 and 1130 are connected with one another via internal buses.

To the image processing apparatus shown in FIG. 1, there are connected via a system bus 1800 the data processing hardware (ASIC) 1100 having the dedicated hardware processing sections 1110, 1120 and 1130, an image reading section 1200 which reads an original document and the like using a scanner, an image output section 1300 which outputs image data to a paper or other media by using a printer, an external interface section (external I/F section) 1400 which exchanges the image data with an external medium (CD, DVD, SD card or the like) or an external device (personal computer or the like), a data memory 1500 which is a work memory of the data processing hardware (ASIC) 1100, a mass storage section 1600 which saves the image data for the purpose of backup, reuse or the like by means of a hard disk or the like, and a control section 1700 which controls the operation of the entire apparatus. It should be noted that the data memory 1500 is used as a work memory for not only the data processing hardware 1100 but also the image reading section 1200, image output section 1300, external interface section (external I/F section) 1400, data memory 1500, mass storage section 1600 and control section 1700.

Figure 2:
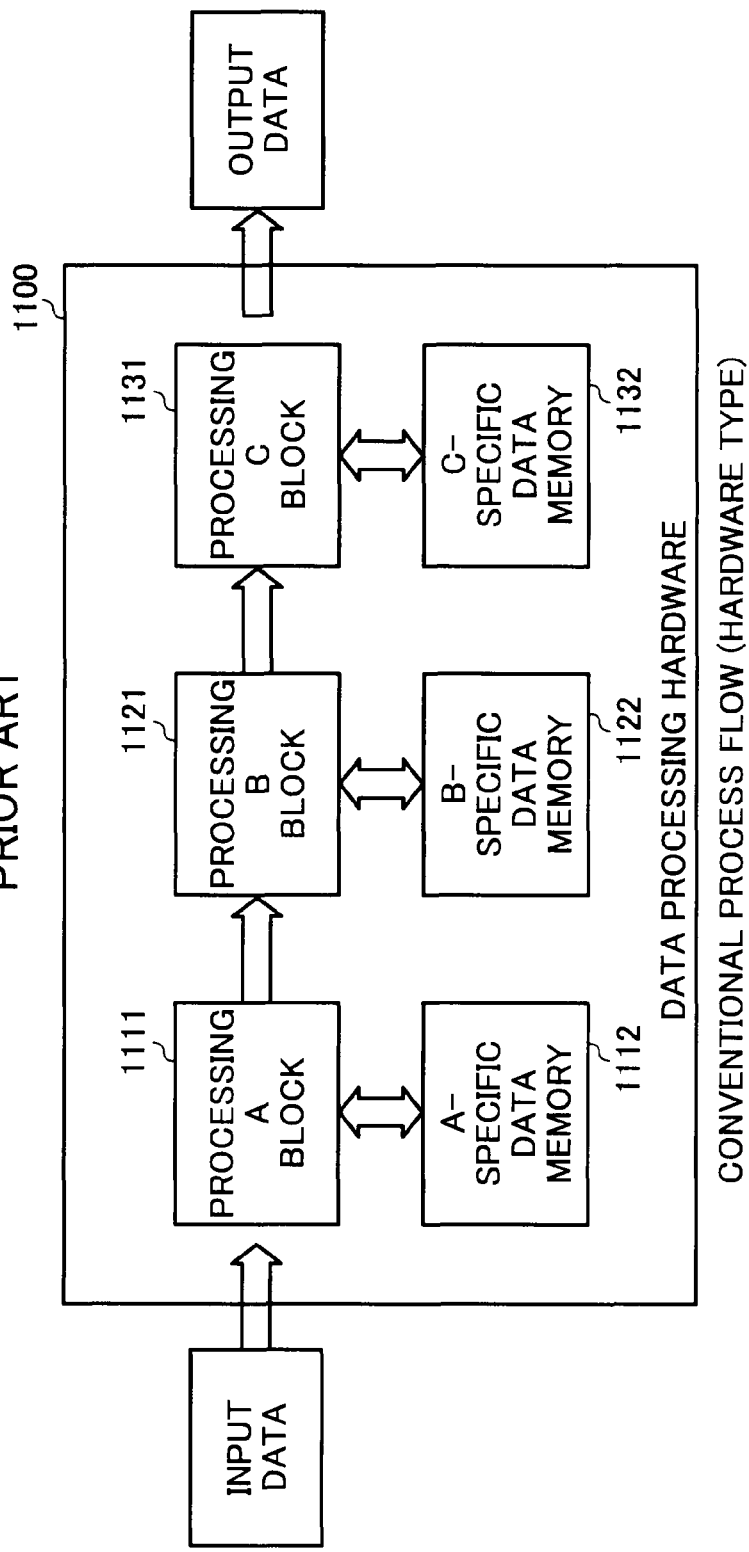
FIG. 2 is a figure showing a process flow carried out inside the ASIC.

FIG. 2 is a figure showing a process flow for the case where image data, which is inputted from the image reading section 1200 or the like, is subjected to three types of image processes in order of A processing, B processing and C processing within the dedicated data processing hardware (ASIC) 1100, and then outputted to the image output section 1300 or the like. First, the hard logic processing A block 1111 uses the A-specific data memory 1112 to execute the processing A on the inputted image data, and transfers the image data obtained after the processing to the processing B block 1121. The processing B block 1121 uses the B-specific data memory 1122 to execute the processing B on the image data which is transferred from the processing A block 1111, and transfers the image data obtained after the processing to the processing C block 1131. The processing C block 1131 uses the C-specific data memory 1132 to execute the processing C on the image data which is transferred from the processing B block 1121, and outputs thus obtained image data. Here, the control section 1700, for example, performs control as to which processing block is to be operated.

In the image processing apparatus shown in FIG. 1, the advantage of using the data processing hardware (ASIC) having a plurality of dedicated processing sections is that, as described above, the speed performance is excellent. However, since this hardware is designed in hard logic, a disadvantage is that it lacks flexibility in changing and adding functions. As a solution to this problem, sometimes a programmable device such as a DSP (digital signal processor) is used.

Figure 3:
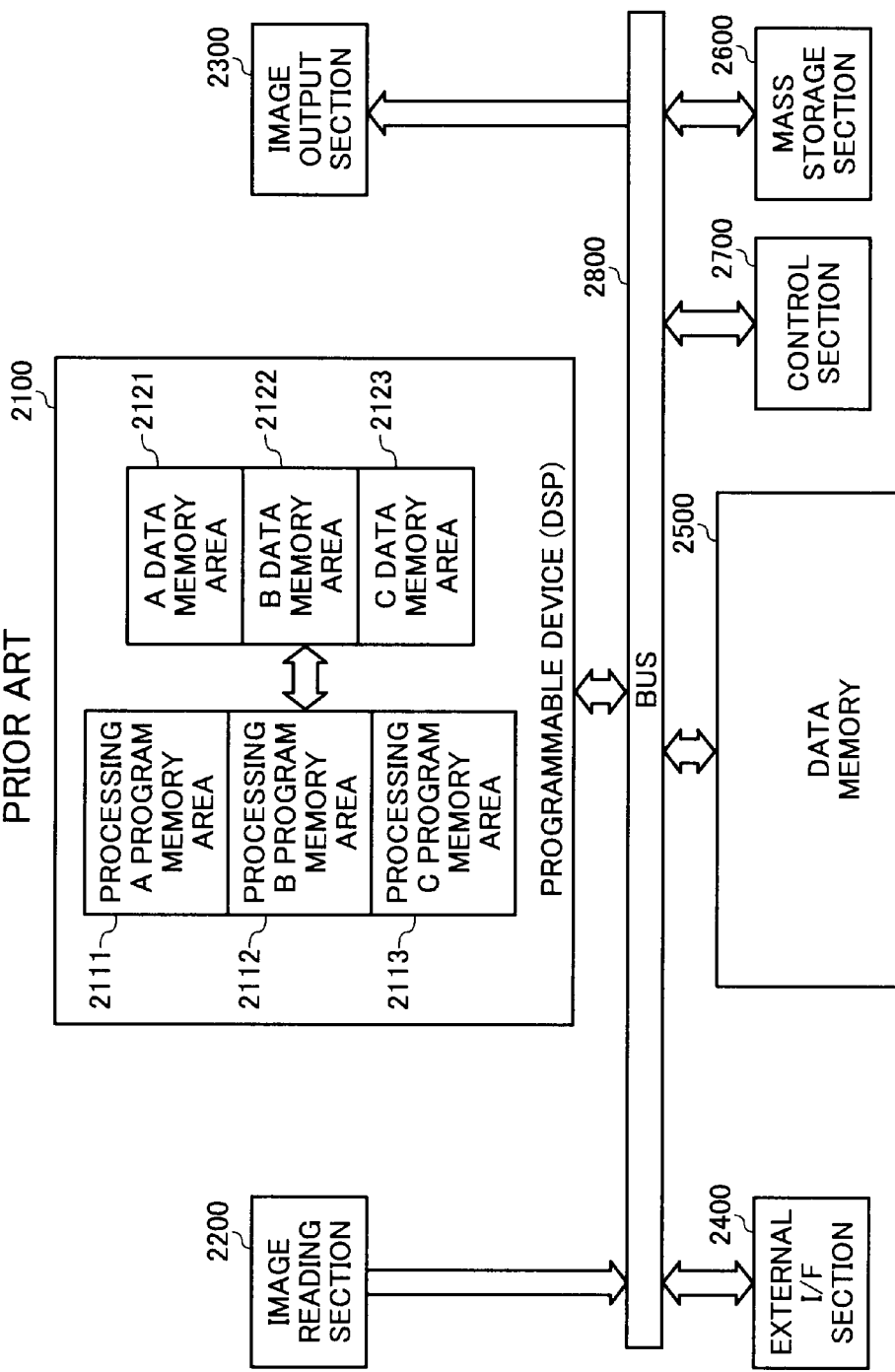
FIG. 3 is a figure showing a system configuration of an image processing apparatus that uses a conventional DSP.

FIG. 3 shows an example of a system configuration of a conventional image processing apparatus that realizes a plurality of processing functions by using a programmable device (DSP). The image processing apparatus shown in FIG. 3 has basically the same system configuration as the image processing apparatus shown in FIG. 1, but the data processing hardware, ASIC, is replaced with a programmable device 2100, DSP, in the image processing apparatus shown in FIG. 3. In the programmable device 2100, a plurality of programs corresponding to a plurality of processing functions respectively (here, a processing A program, processing B program and processing C program) are loaded in program memory areas 2111, 2112 and 2113 respectively in advance. Moreover, a data memory area is secured for each processing program in advance. Here, these data memory areas are an A data memory area 2121, B data memory area 2122, and C data memory area 2123.

Figure 4:
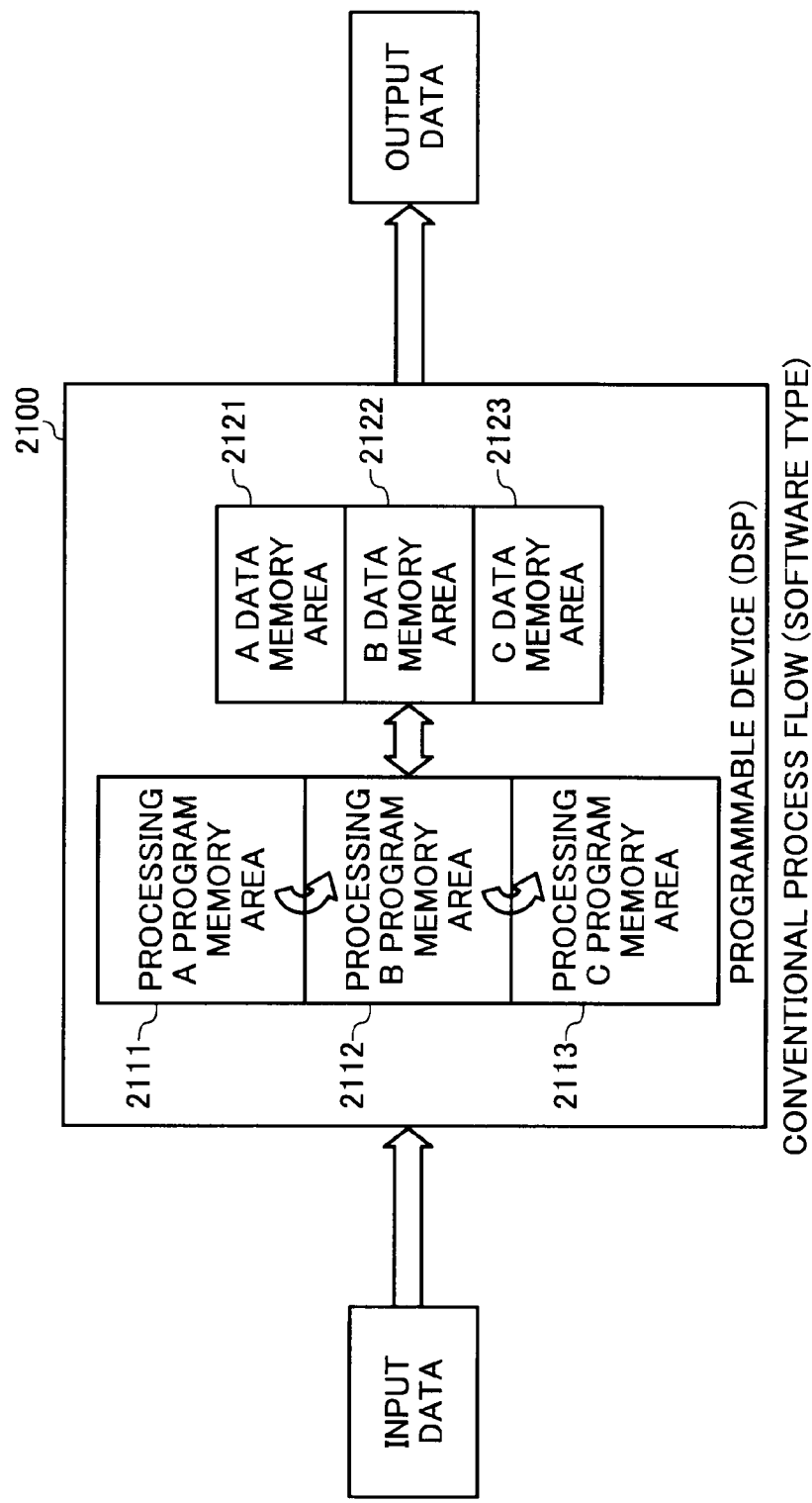
FIG. 4 is a figure showing a process flow carried out inside the DSP.

FIG. 4 is a figure showing a process flow for the case where image data, which is inputted from an image reading section 2200 or the like, is subjected to three types of image processes in order of A processing, B processing and C processing by means of the programmable device (DSP) 2100, and then outputted to an image output section 2300 or the like. First, the processing A program in the program memory area 2111 uses the A data memory area 2121 to execute the processing A on the inputted image data. Next, the processing B program in the program memory area 2112 uses the B data memory area 2122 to execute the processing B on the image data processed by the processing A program. Finally, the processing C program in the program memory area 2113 uses the C data memory area 2123 to execute the processing C on the image data processed by the processing B program, and then thus obtained image data is outputted. A control section 2700, for example, performs control as to which processing program is to be operated.

An advantage of using the programmable device such as a DSP is that, as described above, it can deal with flexibility in changing/adding processing functions by downloading again a processing program inside the DSP. However, since this programmable device is used for software processing, a disadvantage is that it lacks speed performance, compared to dedicated hard logic. Moreover, a processing program memory and processing data memory are required in the conventional programmable device as much as the number of processes to be performed, thus such programmable device has another disadvantage of high expense.

Hereinafter, the present invention which solves the above-described problems of the conventional technology is described in detail with reference to the drawings.

[System Configuration]

Figure 5:
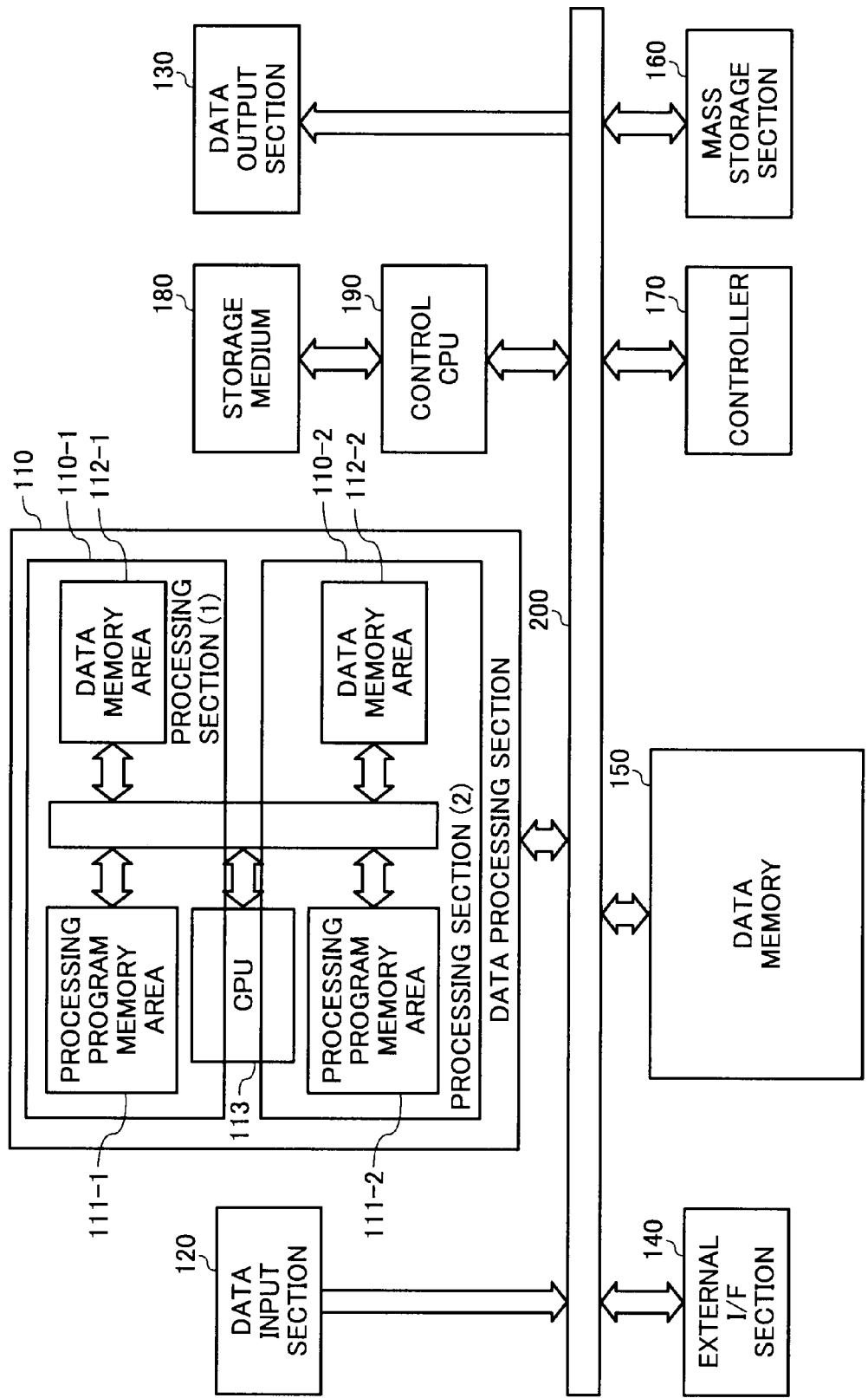
FIG. 5 is a figure showing an example of a system configuration of the image processing apparatus of the present invention.

FIG. 5 shows an example of a system configuration of the image processing apparatus of the present invention. The present image processing apparatus is constituted by: a programmable data processing section 110 such as a DSP; a data input section 120 such as a scanner for inputting an original document or other image data; a data output section 130 such as a printer for outputting the image data to a paper or other media; an external interface section (external I/F section) 140 which exchanges the image data with an external medium (CD, DVD, SD card or the like) or an external device (personal computer or the like); a data memory 150 such as a DDR for temporarily storing therein the image data inputted from the data input section 120 or the external I/F section 140, processed image data, a program code ("program" hereinafter) and the like; a mass storage section 160 such as a hard disk for saving the image data for the purpose of backup, reuse or the like; a controller 170 such as a DMA controller for performing control so as to transfer the program on the data memory 150 or the image data to the data processing section 110 and to output the processed image data on the data memory to the data output section 130 and the like; a non-volatile storage medium 180 in which a plurality of programs are stored; a control CPU 190 which controls the operation of the entire apparatus and controls the loading of the programs stored in the storage medium 180 into the data memory 150 or data processing section 110; and a system bus 200 which connects these components. It should be noted that the control CPU 190 may have the function of the controller 170, in which case the controller 170 is not required.

The data processing section 110 has a plurality of processing sections capable of performing different processes simultaneously. In the present invention, the data processing section 110 has two processing sections: a processing section (1) 110-1; and a processing section (2) 110-2. The processing section (1) 110-1 is constituted by a processing program memory area (program memory) 111-1, data memory area 112-1, and CPU 113 which executes a program of the processing program area 111-1. The processing section (2) 110-2 is constituted by a processing program memory area 111-2, data memory area 112-2, and the CPU 113 which executes a program of the processing program area 111-2. The CPU 113 is, for example, a dual processor and is shared by the processing section (1) 110-1 and processing section (2) 110-2. It should be noted that the CPU may be provided in the processing section (1) 110-1 and the processing section (2) 110-2 independently.

[Basic Operation]

In the processing section (1) 110-1 and processing section (2) 110-2 of the data processing section 110, not only one process but also a plurality of processes can be executed concurrently in circles under the control of the controller 170 or control CPU 190 (multi round image processing).

Figure 6:
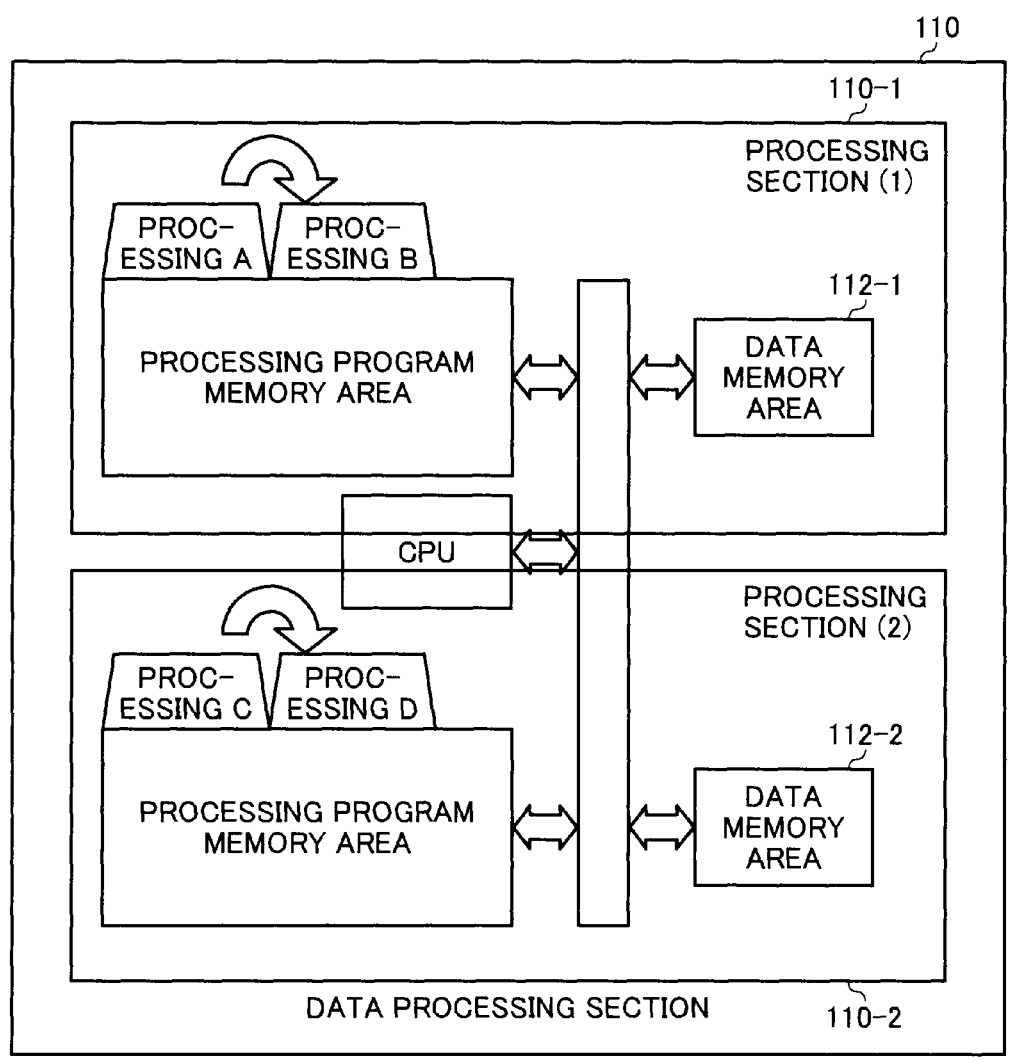
FIG. 6 is a figure for explaining an overview of multi round image processing carried out in a data processing section according to the present invention.

FIG. 6 shows an example in which in the processing section (1) 110-1 a processing A program and processing B program are sequentially loaded into the processing program memory area 111-1 so that processing A and processing B are sequentially executed in circles, while in the processing section (2) 110-2 a processing C program and processing D program are sequentially loaded into the processing program memory area 111-2 so that processing C and processing D are sequentially executed in circles. The processing programs are loaded from the data memory 150 or storage medium 180 into the processing program memory areas 111-1, 111-2, and then rewritten in an overwriting manner. Image data to be processed is loaded from the data memory 150 into the data memory areas 112-1, 112-2, and processed image data is written back to the data memory 150. Furthermore, in the case where image data is processed in one processing section and thereafter subsequent processing is executed on this processed image data in another processing section, the image data is transferred between these processing sections via an internal bus of the data processing section 110.

Accordingly, in the processing section (1) 110-1 and processing section (2) 110-2 of the data processing section 110, a plurality of processes can be performed by using the small processing program memory areas 111-1, 111-2 or data memory areas 112-1, 112-2 for one processing program at most, thus cost reduction can be achieved. Moreover, the data processing section 110 is a programmable device such as a DSP, and thus can freely change or add processing functions by changing or adding the programs inside the storage medium 180 or the like. Also, different processes can be executed simultaneously in the processing section (1) 110-1 and processing section (2) 110-2, thus the processing performance improves.

Hereinafter, the operation of the apparatus in each embodiment of the present invention is described in detail. It should be noted that in the following descriptions, a program to be processed in the data processing section 110 is loaded from the storage medium 180 into the data memory 150 in advance, and is then loaded from the data memory 150 into the processing section (1) 110-1 and processing section (2) 110-2 of the data processing section 110 under the control of the controller 170. However, the program may be loaded from the storage medium 180 directly into the processing section (1) 110-1 and processing section (2) 110-2 via the system bus 200 under the control of the control CPU 190.

Embodiment 1

FIG. 7 shows flows of programs and data in the present embodiment. In the present embodiment, in the case where three types of image processes, i.e., processing A, processing B and processing C, are executed in this order on image data which is inputted from the data input section 120, and then the processed image data is outputted to the data output section 130, the processing section (1) 110-1 of the data processing section 110 takes charge of the processing A and processing C, while the processing section (2) 110-2 takes charge of the processing B.

Although abbreviated in FIG. 7, the control CPU 190 reads the processing A program, processing B program and processing C program inside the storage medium 180 when starting up the system, and loads these programs into predetermined areas in the data memory 150 via the system bus 200. Although the processing programs generally contain processing parameters, these parameters are omitted here. The control CPU 190 further sends, to the controller 170, an address, selection sequence, destination (load destination) and information required for control of each processing program loaded in the data memory 150, and sets these items into the controller 170.

Thereafter, the initiative for control is granted to the controller 170, whereby, under the control of the controller 170, loading of the programs and transferring and writing back of image data are repeated between the data processing section 110, i.e. the processing section (1) 110-1 and processing section (2) 110-2, and the data memory 150, the processing A, processing B and processing C are executed in circles in this order, and then the processed image data is outputted to the data output section 130, as shown in FIG. 7. Hereinafter, the flows of programs and data shown in FIG. 7 are described step by step in detail.

When a start button is pressed, image data, which is read by the data input section 120, is stored in the data memory 150 via the system bus 200. Preprocessed image data shown in FIG. 7 indicates this process.

The controller 170 reads out the processing A program and the processing B program from the data memory 150, and sends the processing A program to the processing section (1) 110-1 of the data processing section 110 and the processing B program to the processing section (2) 110-2, in the form of DMA via the system bus 200. The processing section (1) 110-1 stores (loads) the sent processing A program into the processing program memory area 111-1, and the processing section (2) 110-2 stores (loads) the sent processing B program into the processing program memory area 111-2.

Next, the controller 170 reads out the image data to be processed (preprocessed image data) from the data memory 150, and, in the same manner, transfers the image data to the processing section (1) 110-1 of the data processing section 110 in the form of DMA via the system bus 200. The processing section (1) 110-1 stores the image data transferred from the data memory 150, into the data memory area 112-1.

In the processing section (1) 110-1 of the data processing section 110, the processing A (shading correction or the like, for example) is executed on the image data stored in the data memory area 112-1, on the basis of the processing A program of the processing program memory area 111-1, and then the image data, which is obtained after executing the processing A, is stored in the data memory area 112-2 of the processing section (2) 110-2 via the internal bus of the data processing section 110. Accordingly, in the processing section (2) 110-2, the processing B (MTF filtering, gamma conversion, and the like, for example) is executed on the image data which is obtained after the processing A and stored in the data memory area 112-2, on the basis of the processing B program of the processing program memory area 111-2, and then the image data, which is obtained after the processing B, is written back to the data memory 150 via the system bus 200. Processed image data shown in FIG. 7 shows the above processing.

It should be noted that, for example, each processing program may define whether to transfer the processed image data from the data memory area of one processing section to the data memory area of another processing section via the internal bus of the data processing section 110, or whether to write the processed image data back into the data memory 150 via the system bus 200. Alternatively, the control CPU 190 may send a notice to the CPU 113 of the data processing section 110 prior to processing.

On the other hand, when the controller 170 confirms completion of processing of the processing A program performed in the processing section (1) 110-1 after receiving a notice of completion from the processing section (1) 110-1 of the data processing section 110, the controller 170 reads out the processing C program from the data memory 150, and sends the processing C program to the processing section (1) 110-1 of the data processing section 110 in the form of DMA via the system bus 200. The processing section (1) 110-1 writes the sent processing C program over the previous processing A program, and stores (loads) thus obtained program into the processing program memory area 111-1. This load operation of the processing C program in the processing section (1) 110-1 is executed in parallel with the processing of the processing B program performed in the processing section (2) 110-2.

Next, once the controller 170 confirms completion of the processing of the processing B program performed by the processing section (2) 110-2 by receiving a notice of completion from the processing section (2) 110-2 of the data processing section 110 or by monitoring that the data is written back from processing section (2) 110-2 to the data memory 150, the controller 170 reads out the image data, which is obtained after the processing B, from the data memory 150, and transfers the image data to the processing section (1) 110-1 of the data processing section 110 in the form of DMA via the system bus 200.

The processing section (1) 110-1 of the data processing section 110 stores the image data, which is obtained after the processing B and then transferred from the data memory 150, into the data memory area 112-1, executes the processing C (gradation processing and the like, for example) on this image data obtained after the processing B, on the basis of the processing C program inside the processing program memory area 111-1, and writes the image data obtained after the processing C back into the data memory 150 via the system bus 200.

Once the controller 170 confirms completion of the processing of the processing C program performed by the processing section (1) 110-1 by receiving a notice of completion from the processing section (1) 110-1 of the data processing section 110 or by monitoring that the data is written back from the processing section (1) 110-1 to the data memory 150, the controller 170 determines that all necessary processes are finished, reads out the processed image data from the data memory 150, and outputs the image data to the data output section 130. It should be noted that the control CPU 190 may take charge of this output processing.

FIG. 8 shows a time chart of the present embodiment. When input of image data is started at time to and ends at time $t_1$, the controller 170 loads the processing A program and processing B program into the processing section (1) 110-1 and processing section (2) 110-2 respectively ($t_1$ through $t_2$). Next, the controller 170 transfers image data of the data memory 150 to the processing section (1) 110-1. The processing section (1) 110-1 executes the processing A on the image data, and transfers the image data obtained after the processing A to the processing section (2) 110-2 ($t_2$ through $t_3$). The processing section (2) 110-2 executes the processing B on the image data obtained after the processing A, and writes the image data obtained after the processing B back into the data memory 150 ($t_3$ through $t_4$).

On the other hand, the controller 170 sends the processing C program to the processing section (1) 110-1 while the processing B is executed in the processing section (2) 110-2 ($t_3$ through $t_4$) at the same time. Next, the controller 170 transfers the image data, which is obtained after the processing B and then written back into the data memory 150, to the processing section (1) 110-1. The processing section (1) 110-1 executes the processing C on the image data obtained after the processing B, and writes the image data obtained after the processing C back into the data memory 150 ($t_4$ through $t_5$). After time $t_5$, the controller 170 outputs the image data obtained after the processing C to the data output section 130 from the data memory 150.

In the present embodiment, the processing functions are improved by the number of simultaneous loading operations of loading the processing A program and processing B program and the number of parallel operations of executing the processing B and loading the processing C program. Moreover, in the processing section (1) 110-1 of the data processing section 110, the processing A and processing C can be carried out by using the data memory areas in the program memory areas for one processing program at most. Of course, the processing section (2) 110-2 may execute the processing A and processing C, and the processing section (1) 110-1 may execute the processing B.

Embodiment 2

FIG. 9 and FIG. 10 each show flows of programs and data according to the present embodiment. In the present embodiment, when there is no particular restriction on the process sequence of a plurality of processes, image data to be processed is divided and the processing section (1) 110-1 and the processing section (2) 110-2 each alternately execute the plurality of processings simultaneously on the obtained divided data items.

As shown in the examples of FIG. 9 and FIG. 10, in the case where the processing A, processing B, processing C and processing D are executed on image data which is inputted from the data input section 120 (the order of the processings is arbitrary), and the processed image data is outputted to the data output section 130, the inputted image data is divided into two parts. The processing section (1) 110-1 takes charge of the processing for the first half, i.e. the divided data 1, and the processing section (2) 110-2 takes charge of the second half, i.e. the divided data 2. First, the processing section (1) 110-1 executes the processing A and processing C in parallel on the divided data 1, and the processing section (2) 110-2 executes the processing B and processing D in parallel on the divided data 2 (FIG. 9). Next, the processing section (1) 110-1 executes the processing B and processing D in parallel on the divided data 1 obtained after the processing A and processing C, and the processing section (2) 110-2 likewise executes the processing A and processing C in parallel on the divided data 2 obtained after the processing B and processing D (FIG. 10). Thus obtained image data on which the processings A through D are executed is then outputted.

Hereinafter, the flows of programs and data shown in FIG. 9 and FIG. 10 are described step by step in detail. It should be noted that FIG. 11 shows a transition of the processed image data inside the data memory 150 according to the present embodiment.

The control CPU 190 reads the processing A program, processing B program, processing C program and processing D program inside the storage medium 180 when starting up the system, and loads these programs into predetermined areas in the data memory 150 via the system bus 200. Although the processing programs generally contain processing parameters, these parameters are omitted here. The control CPU 190 further sends, to the controller 170, an address, selection sequence, destination (load destination) and information required for control of each processing program loaded in the data memory 150, and sets these items into the controller 170. Thereafter, as shown in FIG. 9 and FIG. 10, under the control of the controller 170, loading of the programs and transferring and writing back of image data are repeated between the data processing section 110, i.e. the processing section (1) 110-1 and processing section (2) 110-2, and the data memory 150, the processing A, processing C, processing B and processing D are executed in parallel on the first half and second half of the inputted image data, and the image data obtained after the processings A through D is outputted to the data output section 130.

First, the flows of programs and data shown in FIG. 9 are described. FIG. 9 shows a sequence in which image data is inputted from the data input section 120, the processing A and processing C are carried out on the first half of the image data, and the processing B and processing D are carried out on the second half of the image data.

When a start button is pressed, the image data, which is read by the data input section 120, is stored in the data memory 150 via the system bus 200. Preprocessed image data shown in FIG. 9 indicates this process.

The controller 170 reads out the processing A program and the processing B program from the data memory 150, and sends the processing A program to the processing section (1) 110-1 of the data processing section 110 and the processing B program to the processing section (2) 110-2, in the form of DMA via the system bus 200. The processing section (1) 110-1 stores (loads) the sent processing A program into the processing program memory area 111-1, and the processing section (2) 110-2 stores (loads) the sent processing B program into the processing program memory area 111-2.

Next, the controller 170 reads out the image data to be processed (preprocessed image data) from the data memory 150, and transfers the first half of the image data ("divided data 1" hereinafter) to the processing section (1) 110-1 of the data processing section 110, and the second half of the image data ("divided data 2" hereinafter) to the processing section (2) 110-2, in the form of DMA via the system bus 200. The processing section (1) 110-1 stores the divided data 1 transferred from the data memory 150 into the data memory area 112-1, executes predetermined processing A on the divided data 1 on the basis of the processing A program inside the processing program memory area 111-1, and writes the divided data 1 obtained after the processing A back into the data memory 150 via the system bus 200. The processing section (2) 110-2 stores the divided data 2 transferred from the data memory 150 into the data memory area 112-2, executes predetermined processing B on the divided data 2 on the basis of the processing B program inside the processing program memory area 111-2, and writes the divided data 2 obtained after the processing B back into the data memory 150 via the system bus 200. The processing performed by the processing section (1) 110-1 and the processing performed by the processing section (2) 110-2 are executed in parallel. FIG. 11A shows a condition of the processed image data inside the data memory 150 as of this moment.

Once the controller 170 confirms completion of the processing A and processing B performed by the processing section (1) 110-1 and processing section (2) 110-2 respectively by receiving a notice of completion from the processing section (1) 110-1 and processing section (2) 110-2 of the data processing section 110 or by monitoring that the data is written back from the processing section (1) 110-1 and processing section (2) 110-2 to the data memory 150, the controller 170 then reads out the processing C program and processing D program from the data memory 150, and sends the processing C program to the processing section (1) 110-1 of the data processing section 110 and the processing D program to the processing section (2) 110-2 of the data processing section 110, in the form of DMA via the system bus 200. The processing section (1) 110-1 and processing section (2) 110-2 write the sent processing C program and processing D program over the previous processing A program and processing B program, and store thus obtained programs into the processing program memory area 111-1 and processing program memory area 111-2 respectively.

Next, the controller 170 reads out the processed image data (FIG. 11A) from the data memory 150, and transfers the first half of this processed image data, i.e. the divided data 1 obtained after the processing A, to the processing section (1) 110-1 of the data processing section 110 and the second half of the processed image data, i.e. the divided data 2 obtained after the processing B, to the processing section (2) 110-2, in the form of DMA via the system bus 200. The processing section (1) 110-1 stores the divided data 1, which is obtained after the processing A and transferred from the data memory 150, into the data memory area 112-1, executes predetermined processing C on the divided data 1 on the basis of the processing C program inside the processing program memory area 111-1, and writes the divided data 1 obtained after the processing C back into the data memory 150 via the system bus 200. In parallel with this processing performed by the processing section (1) 110-1, the processing section (2) 110-2 stores the divided data 2, which is obtained after the processing B and transferred from the data memory 150, into the data memory area 112-2, executes predetermined processing D on the divided data 2 on the basis of the processing D program inside the processing program memory area 111-2, and writes the divided data 2 obtained after the processing D back into the data memory 150 via the system bus 200. FIG. 11B shows a condition of the processed image data inside the data memory 150 as of this moment.

The above is the explanation of the flows of programs and data shown in FIG. 9.

Next, the flows of programs and data shown in FIG. 10 are described. FIG. 10 shows a sequence in which the processing B and processing D are carried out on the divided data 1, which is the first half of the image data and has been subjected to the processing A and processing C, the processing A and processing C are carried out on the divided data 2, which is the second half of the image data and has been subjected to the processing B and processing D, and then the image data which is obtained after all of the processings A through D is outputted to the data output section 130.

Once the controller 170 confirms completion of the processing C and processing D performed by the processing section (1) 110-1 and processing section (2) 110-2 respectively, the controller 170 reads out the processing A program and processing B program from the data memory 150 again, and, inversely, sends the processing B program to the processing section (1) 110-1 of the data processing section 110 and the processing A program to the processing section (2) 110-2, in the form of DMA via the system bus 200. The processing section (1) 110-1 writes the sent processing B program over the previous processing C program, and stores thus obtained program into the processing program memory area 111-1. Likewise, the processing section (2) 110-2 writes the sent processing A program over the previous processing D program, and stores thus obtained program into the processing program memory area 111-2.

Next, the controller 170 reads out the processed image data (FIG. 11B) from the data memory 150, and transfers the first half of this processed image data, i.e. the divided data 1 obtained after the processing C, to the processing section (1) 110-1 of the data processing section 110 and the second half of the processed image data, i.e. the divided data 2 obtained after the processing D, to the processing section (2) 110-2, in the form of DMA via the system bus 200. The processing section (1) 110-1 stores the divided data 1, which is obtained after the processing C and transferred from the data memory 150, into the data memory area 112-1, executes the predetermined processing B on the divided data 1 (already finished with the processing A and processing C) on the basis of the processing B program inside the processing program memory area 111-1, and writes the divided data 1 obtained after the processing B back into the data memory 150 via the system bus 200. In parallel with this processing performed by the processing section (1) 110-1, the processing section (2) 110-2 stores the divided data 2, which is obtained after the processing D and transferred from the data memory 150, into the data memory area 112-2, executes the predetermined processing A on the divided data 2 (already finished with the processing B and processing D) on the basis of the processing A program inside the processing program memory area 111-2, and writes the divided data 2 obtained after the processing A back into the data memory 150 via the system bus 200. FIG. 11C shows a condition of the processed image data inside the data memory 150 as of this moment.

Once the controller 170 confirms completion of the processing B and processing A performed by the processing section (1) 110-1 and processing section (2) 110-2 respectively, the controller 170 reads out the processing C program and processing D program from the data memory 150 again, and, inversely, sends the processing D program to the processing section (1) 110-1 of the data processing section 110 and the processing C program to the processing section (2) 110-2, in the form of DMA via the system bus 200. The processing section (1) 110-1 and processing section (2) 110-2 write the sent processing D program and processing C program over the previous processing B program and processing A program, and store thus obtained programs into the processing program memory area 111-1 and processing program memory area 111-2 respectively.

Next, the controller 170 reads out the processed image data (FIG. 11C) from the data memory 150, and transfers the first half of this processed image data, i.e. the divided data 1 obtained after the processing B, to the processing section (1) 110-1 of the data processing section 110 and the second half of the processed image data, i.e. the divided data 2 obtained after the processing A, to the processing section (2) 110-2, in the form of DMA via the system bus 200. The processing section (1) 110-1 stores the divided data 1, which is obtained after the processing B and transferred from the data memory 150, into the data memory area 112-1, executes the predetermined processing D on the divided data 1 (already finished with the processing A, processing C and processing B) on the basis of the processing D program inside the processing program memory area 111-1, and writes the divided data 1 obtained after the processing D back into the data memory 150 via the system bus 200. In parallel with this processing performed by the processing section (1) 110-1, the processing section (2) 110-2 stores the divided data 2, which is obtained after the processing A and transferred from the data memory 150, into the data memory area 112-2, executes the predetermined processing C on the divided data 2 (already finished with the processing B, processing D and processing A) on the basis of the processing C program inside the processing program memory area 111-2, and writes the divided data 2 obtained after the processing C back into the data memory 150 via the system bus 200. FIG. 11D shows a condition of the processed image data inside the data memory 150 as of this moment. Specifically, all of the predetermined processings A through D have been completed on the inputted image data.

Once the controller 170 confirms completion of the processing D and processing C performed by the processing section (1) 110-1 and processing section (2) 110-2 respectively, i.e. once all of the processings A through D have been completed on the inputted image data, the controller 170 reads out the processed image data (FIG. 11D) from the data memory 150, and outputs the processed image data to the data output section 130. In the present embodiment as well, the control CPU 190 may take charge of the output processing.

Figure 12B:
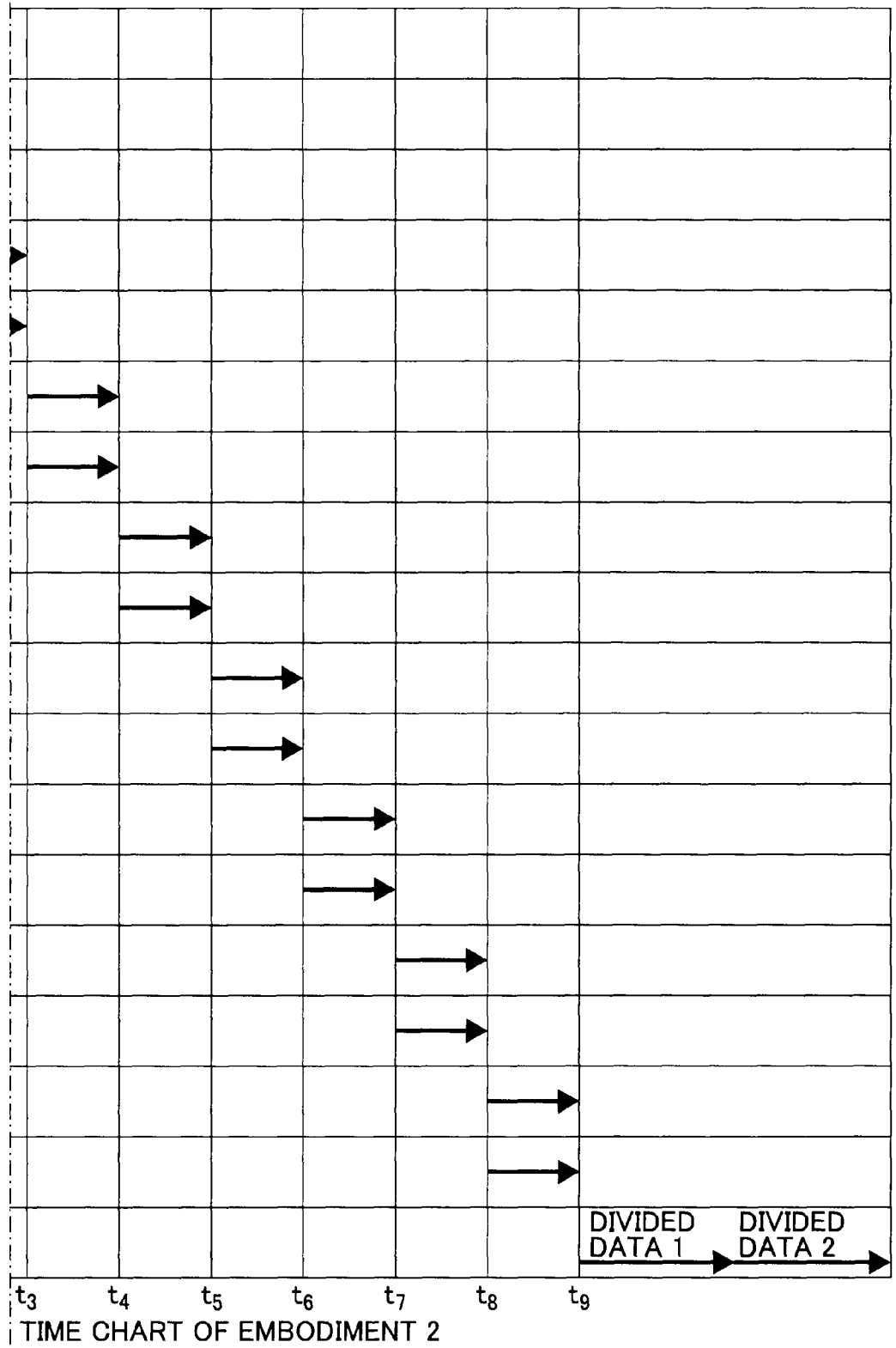
FIG. 12 is a figure showing a time chart of Embodiment 2.

FIG. 12 shows the entire time chart of the present embodiment. When input of image data is started at time to and ends at time $t_1$, the controller 170 first loads the processing A program and processing B program into the processing section (1) 110-1 and processing section (2) 110-2 respectively ($t_1$, through $t_2$). Subsequently, the controller 170 transfers the first half of the preprocessed image data (divided data 1) of the data memory 150 to the processing section (1) 110-1, and the second half (divided data 2) to the processing section (2) 110-2. The processing section (1) 110-1 executes the processing A on the divided data 1 and writes thus obtained data back into the data memory 150, and at the same time the processing section (2) 110-2 executes the processing B on the divided data 2 and writes thus obtained data back into the data memory 150 ($t_2$ through $t_3$) Next, the controller 170 loads the processing C program and processing D program into the processing section (1) 110-1 and processing section (2) 110-2 respectively ($t_3$ through $t_4$) Subsequently, the controller 170 transfers the divided data 1, which is of the processed image data in the data memory 150 and obtained after the processing A, to the processing section (1) 110-1, and the divided data 2 obtained after the processing B to the processing section (2) 110-2. The processing section (1) 110-1 executes the processing C on the divided data 1 obtained after the processing A and writes thus obtained data back into the data memory 150, and at the same time the processing section (2) 110-2 executes the processing D on the divided data 2 obtained after the processing B and writes thus obtained data back into the data memory 150 ($t_4$ through $t_5$).

Consequently, the processing A and processing C have been completed for the first half to the inputted image data, and the processing B and processing C have been completed for the second half of the inputted image data.

Next, the controller 170 loads the processing B program and processing A program into the processing section (1) 110-1 and processing section (2) 110-2 respectively ($t_5$ through $t_6$) Subsequently, the controller 170 transfers the divided data 1, which is of the processed image data in the data memory 150 and obtained after the processing A and processing C, to the processing section (1) 110-1, and the divided data 2 obtained after the processing B and processing D, to the processing section (2) 110-2. The processing section (1) 110-1 executes the processing B on the divided data 1 obtained after the processing A and processing C and writes thus obtained data back into the data memory 150, and at the same time the processing section (2) 110-2 executes the processing A on the divided data 2 obtained after the processing B and processing D and writes thus obtained data back into the data memory 150 ($t_6$ through $t_7$).

Finally, the controller 170 loads the processing D program and processing C program into the processing section (1) 110-1 and processing section (2) 110-2 respectively ($t_7$ through $t_8$). Subsequently, the controller 170 transfers the divided data 1, which is of the processed image data in the data memory 150 and obtained after the processing A, processing C and processing B, to the processing section (1) 110-1, and the divided data 2 obtained after the processing B, processing D and processing A to the processing section (2) 110-2. The processing section (1) 110-1 executes the processing D on the divided data 1 obtained after the processing A, processing C and processing B and writes thus obtained data back into the data memory 150, and at the same time the processing section (2) 110-2 executes the processing C on the divided data 2 obtained after the processing B, processing D and processing A and writes thus obtained data back into the data memory 150 ($t_8$ through $t_9$).

Accordingly, all of the processings A through D have been completed on the inputted image data. After the time $t_9$, the controller 170 outputs the processed image data of the data memory 150, which has been subjected to all processings A through D, to the data output section 130.

In the present embodiment, in the case where a plurality of different processings are executed on image data to be processed, the image data is divided, and the processing section (1) 110-1 and processing section (2) 110-2 each alternately perform the different processings sequentially in parallel on each of thus obtained divided data items, whereby desired image data, which has been subjected to the plurality of processings, can be outputted. Since the processings are carried out in parallel, the processing performance improves. Moreover, the processing section (1) 110-1 and processing section (2) 110-2 of the data processing section 110 can each perform the plurality of processings by using the program memory area for at most one processing program and the data memory areas corresponding to the number of divided data items.

Embodiment 3

Figure 13A:
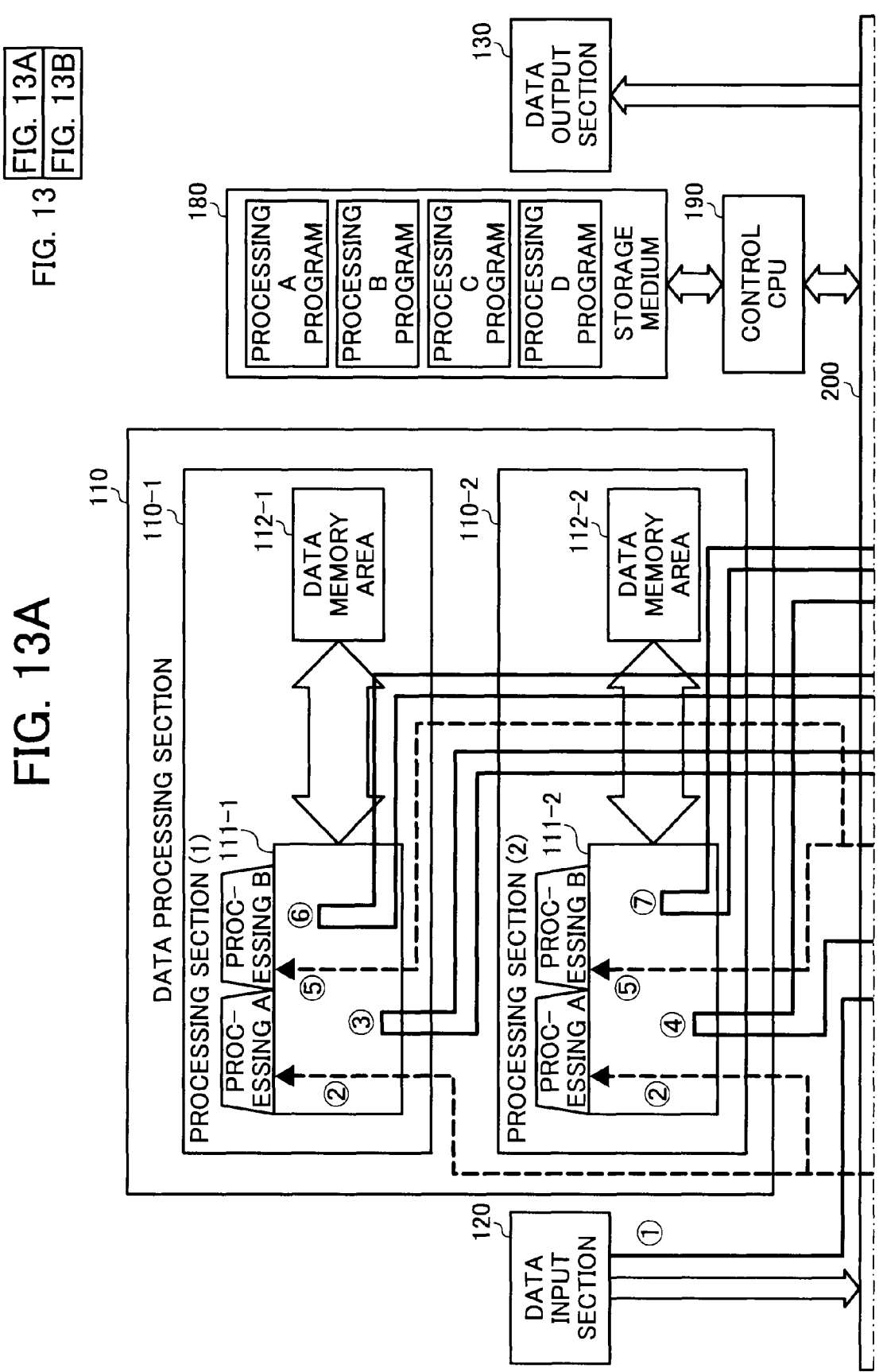
FIG. 13 is a figure showing flows of programs and data according to Embodiment 3 of the present invention.
Figure 13B:
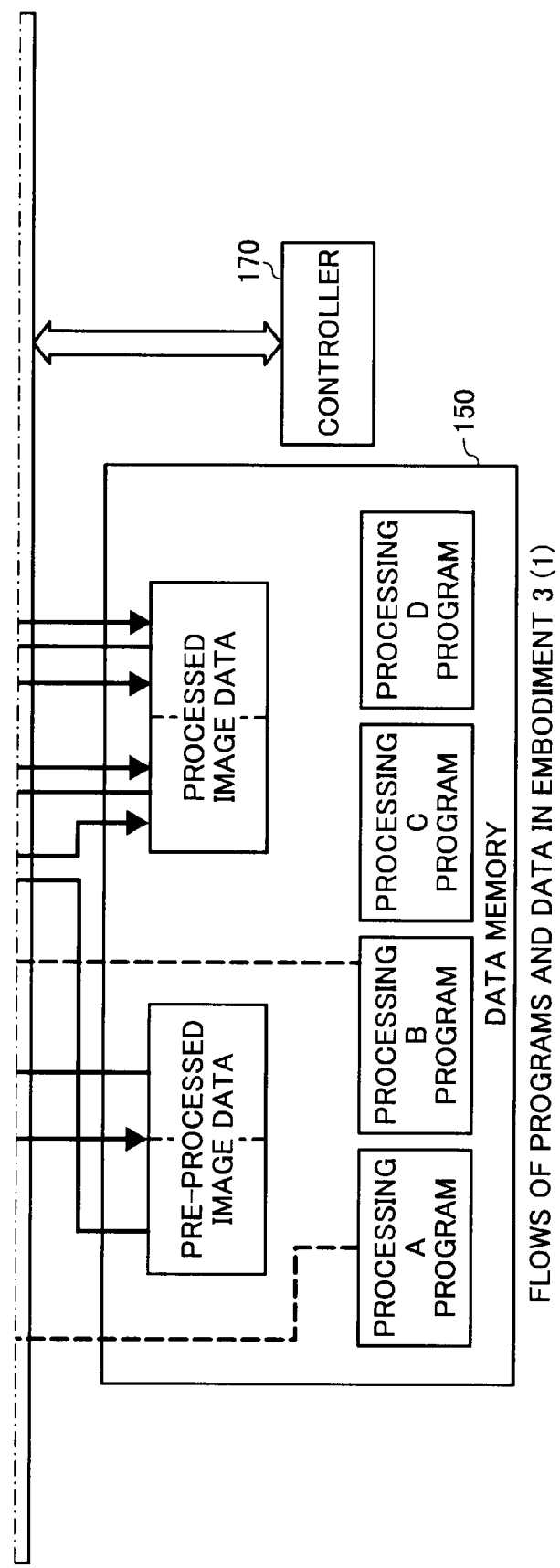
Figure 14B:
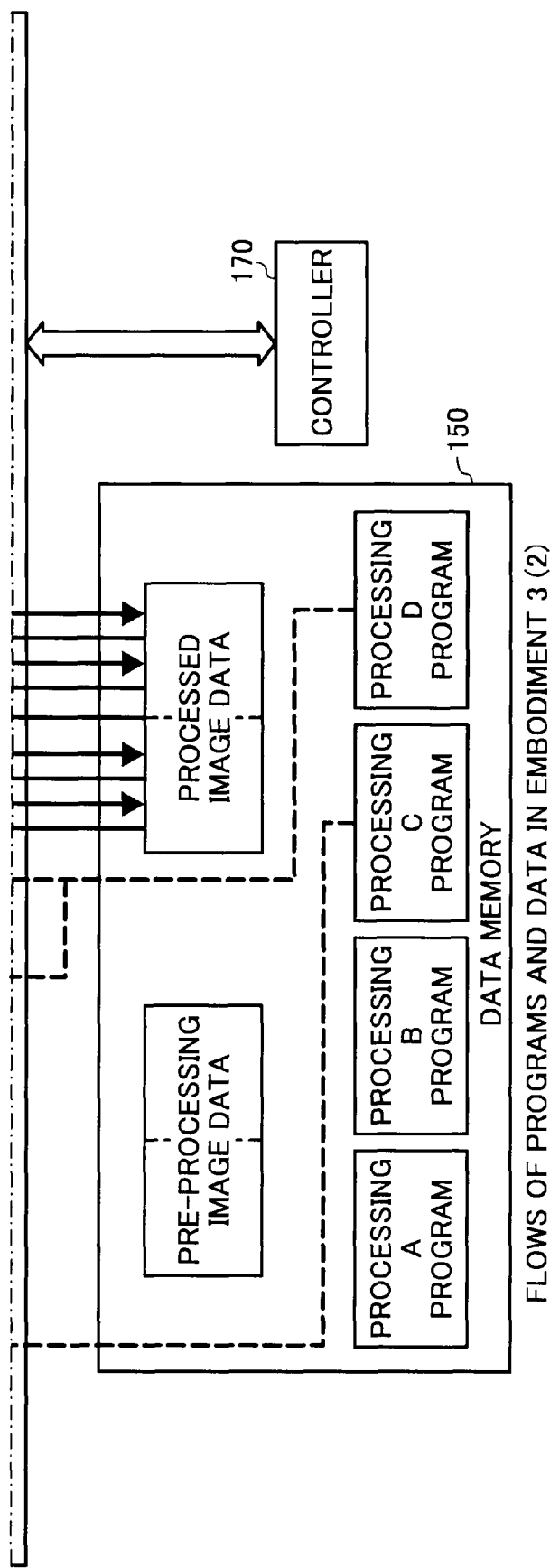
FIG. 14 is a figure showing the continuation of the flows of programs and data according to Embodiment 3.

FIG. 13 and FIG. 14 each show flows of programs and data according to the present embodiment. In Embodiment 2 described above, the same processing program needs to be loaded twice. Moreover, Embodiment 2 is not suitable for the case where there is a restriction on the processing sequence. In the present embodiment, however, image data to be processed is divided, and the processing section (1) 110-1 and processing section (2) 110-2 execute the same processing program in parallel on each of thus obtained divided data items, thus the same processing program does not have to be loaded twice. Also, the present embodiment can be applied to the case where there is a restriction on the processing sequence.

As shown in the examples of FIG. 13 and FIG. 14, image data to be processed, which is inputted from the data input section 120, is divided into two parts. The processing section (1) 110-1 takes charge of the processing for the first half, i.e. the divided data 1, and the processing section (2) 110-2 takes charge of the second half, i.e. the divided data 2. The processing section (1) 110-1 and processing section (2) 110-2 simultaneously execute, on each of the divided data items 1 and 2, the processing A, processing B, processing C and processing D in this order, and output thus obtained processed image data to the data output section 130.

Hereinafter, the flows of programs and data shown in FIG. 13 and FIG. 14 are described in detail. It should be noted that a transition diagram of the processed image data inside the data memory 150 according to the present embodiment is omitted.

As with Embodiment 2 described above, the control CPU 190 reads the processing A program, processing B program, processing C program and processing D program inside the storage medium 180 when starting up the system, and loads these programs into predetermined areas in the data memory 150 via the system bus 200. Although the processing programs generally contain processing parameters, these parameters are omitted here. The control CPU 190 further sends, to the controller 170, an address, selection sequence, destination (load destination) and information required for control of each processing program loaded in the data memory 150, and sets these items into the controller 170. Thereafter, as shown in FIG. 13 and FIG. 14, under the control of the controller 170, loading of the programs and transferring and writing back of image data are repeated between the data processing section 110, i.e. the processing section (1) 110-1 and processing section (2) 110-2, and the data memory 150, the processing A through the processing D are executed in parallel on the first half and second half of the inputted image data, and thus obtained processed image data is outputted to the data output section 130.

First, the flows of programs and data shown in FIG. 13 are described. FIG. 13 shows a sequence in which image data is inputted from the data input section 120, and the processing A and processing B are executed in parallel on the first half and second half of the image data.

When a start button is pressed, the image data, which is read by the data input section 120, is stored in the data memory 150 via the system bus 200. Preprocessed image data shown in FIG. 13 indicates this process.

The controller 170 first reads out the processing A program from the data memory 150, and sends the processing A program to the processing section (1) 110-1 and processing section (2) 110-2 of the data processing section 110 in the form of DMA via the system bus 200. The processing section (1) 110-1 stores (loads) the sent processing A program into the processing program memory area 111-1, and the processing section (2) 110-2 likewise stores (loads) the sent processing A program into the processing program memory area 111-2.

Next, the controller 170 reads out the image data to be processed (preprocessed image data) from the data memory 150, and transfers the first half of the image data ("divided data 1" hereinafter) to the processing section (1) 110-1 of the data processing section 110 and the second half of the image data ("divided data 2" hereinafter) to the processing section (2) 110-2, in the form of DMA via the system bus 200. The processing section (1) 110-1 stores the divided data 1 transferred from the data memory 150 into the data memory area 112-1, executes the predetermined processing A on the divided data 1 on the basis of the processing A program inside the processing program memory area 111-1, and writes the divided data 1 obtained after the processing A back into the data memory 150 via the system bus 200. In parallel with this processing performed by the processing section (1) 110-1, the processing section (2) 110-2 stores the divided data 2 transferred from the data memory 150 into the data memory area 112-2, likewise executes the processing A on the divided data 2 on the basis of the processing A program inside the processing program memory area 111-2, and writes the divided data 2 obtained after the processing A back into the data memory 150 via the system bus 200.

Once the controller 170 confirms completion of the processing A performed by the processing section (1) 110-1 and processing section (2) 110-2 by receiving a notice of completion from the processing section (1) 110-1 and processing section (2) 110-2 of the data processing section 110 or by monitoring that the data is written back from the processing section (1) 110-1 and processing section (2) 110-2 to the data memory 150, the controller 170 then reads out the processing B program from the data memory 150, and sends the processing B program to the processing section (1) 110-1 and processing section (2) 110-2 of the data processing section 110, in the form of DMA via the system bus 200. The processing section (1) 110-1 and processing section (2) 110-2 write the sent processing B program over the previous processing A program, and store thus obtained program into the processing program memory area 111-1 and processing program memory area 111-2.

Next, the controller 170 reads out the image data obtained after the processing A from the data memory 150, and transfers the first half of the image data obtained after the processing A, i.e. the divided data 1, to the processing section (1) 110-1 of the data processing section 110 and the second half of the image data, i.e. the divided data 2, to the processing section (2) 110-2, in the form of DMA via the system bus 200. The processing section (1) 110-1 stores the divided data 1, which is obtained after the processing A and transferred from the data memory 150, into the data memory area 112-1, executes the predetermined processing B on the divided data 1 on the basis of the processing B program inside the processing program memory area 111-1, and writes the divided data 1 obtained after the processing B back into the data memory 150 via the system bus 200. In parallel with this processing performed by the processing section (1) 110-1, the processing section (2) 110-2 stores the divided data 2, which is obtained after the processing A and transferred from the data memory 150, into the data memory area 112-2, executes the predetermined processing B on the divided data 2 on the basis of the processing B program inside the processing program memory area 111-2, and writes the divided data 2 obtained after the processing B back into the data memory 150 via the system bus 200.

The above is the explanation of the flows of programs and data shown in FIG. 13. Next, the flows of programs and data shown in FIG. 14 are described. FIG. 14 shows a sequence in which the processing C and processing D are continuously carried out simultaneously on both the first half and the second half of the imaged at a which has been subjected to the processing A and processing B, and then the image data which is obtained after the processings is outputted to the data output section 130.

Once the controller 170 confirms completion of the processing B performed by the processing section (1) 110-1 and processing section (2) 110-2, the controller 170 reads out the processing C program from the data memory 150, and sends the processing C program to the processing section (1) 110-1 and processing section (2) 110-2 of the data processing section 110, in the form of DMA via the system bus 200. The processing section (1) 110-1 writes the sent processing C program over the previous processing B program, and stores thus obtained program into the processing program memory area 111-1. Likewise, the processing section (2) 110-2 writes the sent processing C program over the previous processing B program, and stores thus obtained program into the processing program memory area 111-2.

Next, the controller 170 reads out the imaged at a obtained after the processing B from the data memory 150, and transfers the first half of this image data obtained after the processing B, i.e. the divided data 1, to the processing section (1) 110-1 of the data processing section 110 and the second half of the image data, i.e. the divided data 2, to the processing section (2) 110-2, in the form of DMA via the system bus 200. The processing section (1) 110-1 stores the divided data 1, which is obtained after the processing B and transferred from the data memory 150, into the data memory area 112-1, executes the predetermined processing C on the divided data 1 (already finished with the processing A and processing B) on the basis of the processing C program inside the processing program memory area 111-1, and writes the divided data 1 obtained after the processing C back into the data memory 150 via the system bus 200. In parallel with this processing performed by the processing section (1) 110-1, the processing section (2) 110-2 likewise stores the divided data 2, which is obtained after the processing B and transferred from the data memory 150, into the data memory area 112-2, executes the predetermined processing C on the divided data 2 (already finished with the processing A and processing B) on the basis of the processing C program inside the processing program memory area 111-2, and writes the divided data 2 obtained after the processing C back into the data memory 150 via the system bus 200.

Once the controller 170 confirms completion of the processing C performed by the processing section (1) 110-1 and processing section (2) 110-2, the controller 170 reads out the processing D program from the data memory 150, and sends the processing D program to the processing section (1) 110-1 and processing section (2) 110-2 of the data processing section 110, in the form of DMA via the system bus 200. The processing section (1) 110-1 and processing section (2) 110-2 write the sent processing D program over the previous processing C program, and stores thus obtained program into the processing program memory area 111-1 and processing program memory area 111-2.

Next, the controller 170 reads out the image data obtained after the processing C from the data memory 150, and transfers the first half of this image data obtained after the processing C, i.e. the divided data 1, to the processing section (1) 110-1 of the data processing section 110 and the second half of the image data, i.e. the divided data 2, to the processing section (2) 110-2, in the form of DMA via the system bus 200. The processing section (1) 110-1 stores the divided data 1, which is obtained after the processing C and transferred from the data memory 150, into the data memory area 112-1, executes the predetermined processing D on the divided data 1 (already finished with the processing A, processing B and processing C) on the basis of the processing D program inside the processing program memory area 111-1, and writes the divided data 1 obtained after the processing D back into the data memory 150 via the system bus 200. In parallel with this processing performed by the processing section (1) 110-1, the processing section (2) 110-2 likewise stores the divided data 2, which is obtained after the processing C and transferred from the data memory 150, into the data memory area 112-2, executes the predetermined processing D on the divided data 2 (already finished with the processing A, processing B and processing C) on the basis of the processing D program inside the processing program memory area 111-2, and writes the divided data 2 obtained after the processing D back into the data memory 150 via the system bus 200. Accordingly, the predetermined processings A through D have been completed sequentially on the inputted image data.

Once the controller 170 confirms completion of the processing D performed by the processing section (1) 110-1 and processing section (2) 110-2, i.e. once all of the processings A through D have been completed on the inputted image data, the controller 170 reads out the processed image data from the data memory 150, and outputs the processed image data to the data output section 130. In the present embodiment as well, the control CPU 190 may take charge of the output processing.

Figure 15A:
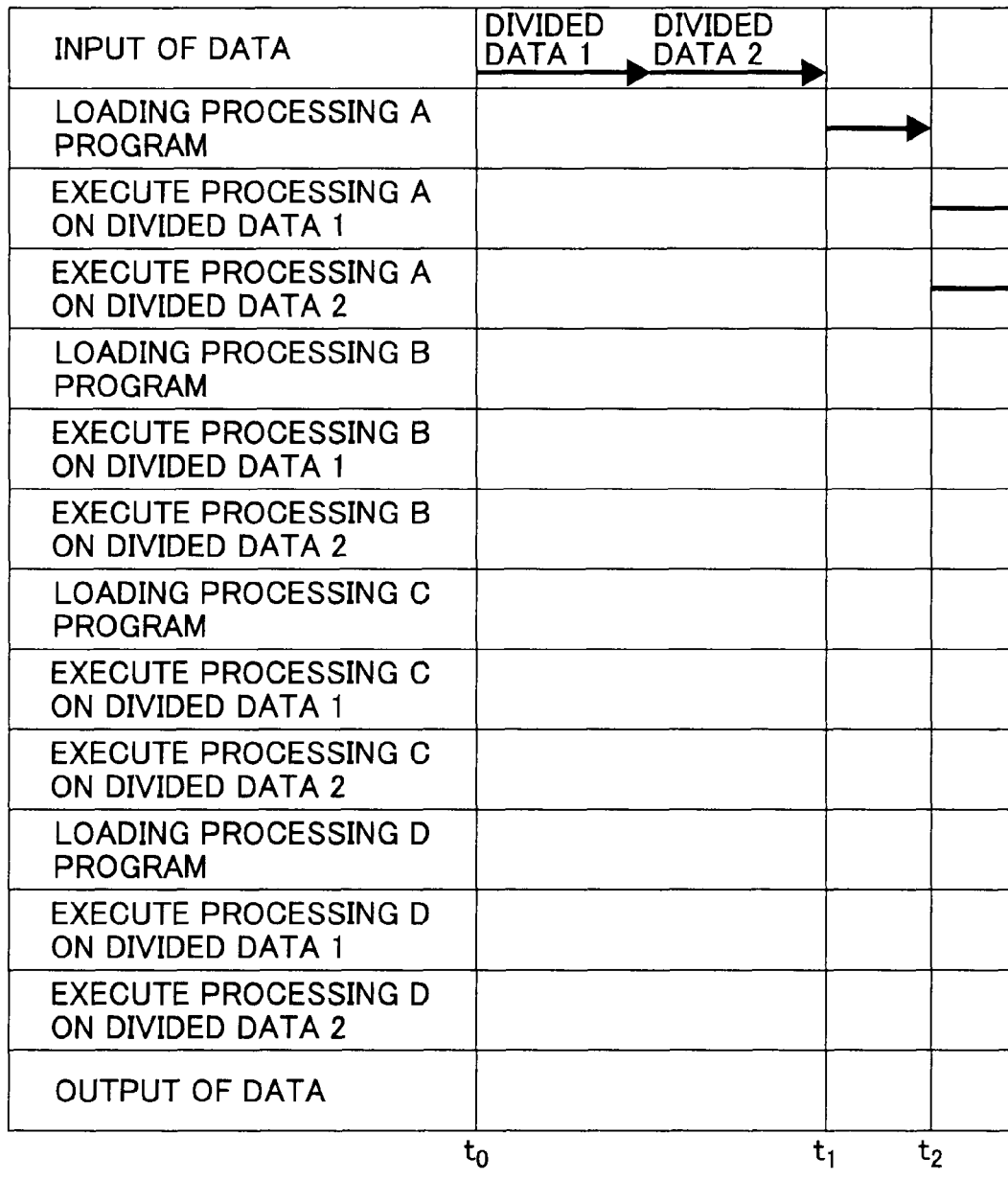
FIG. 15 is a figure showing a time chart of Embodiment 3.
Figure 15B:
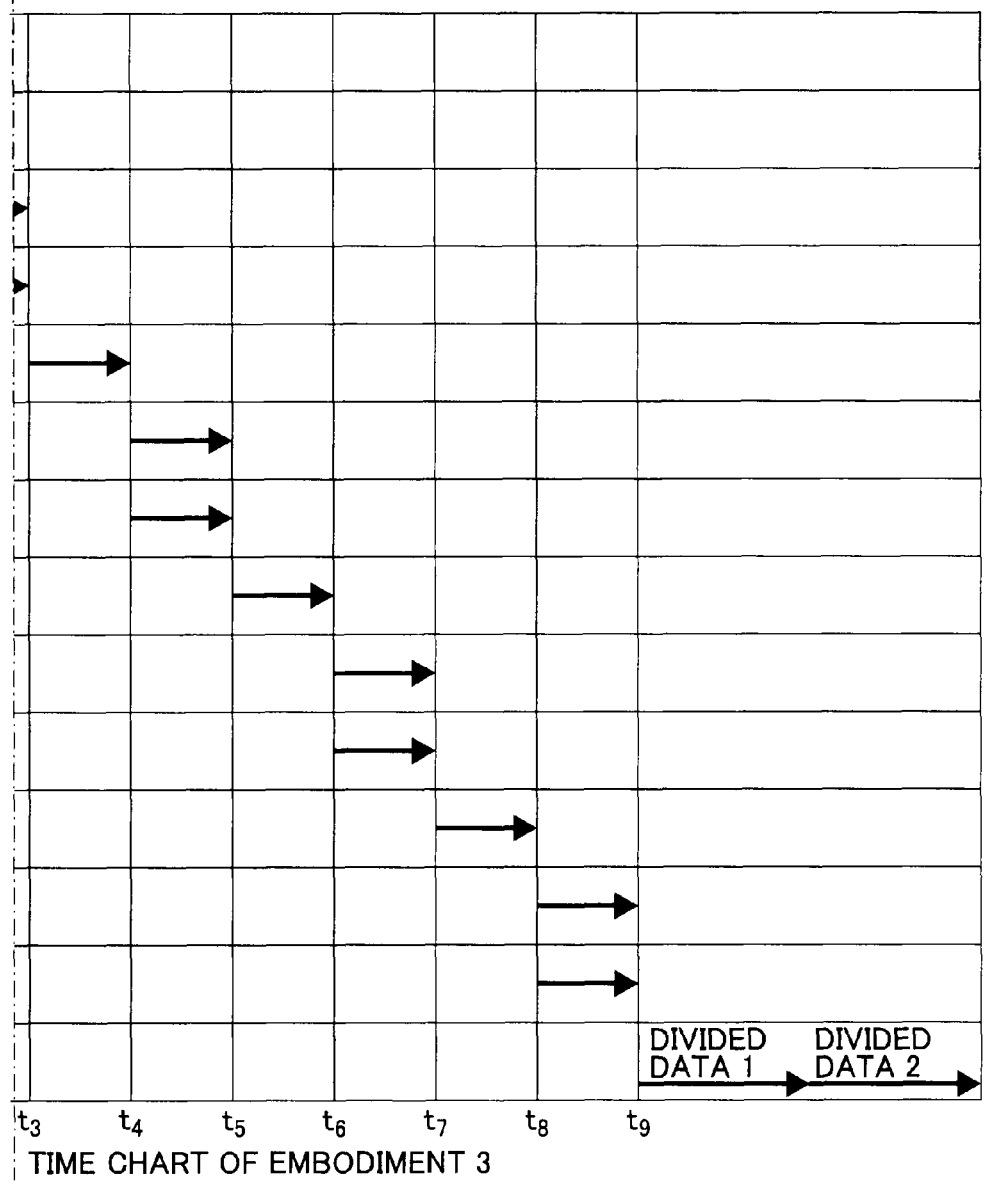

FIG. 15 shows the entire time chart of the present embodiment. When input of image data is started at time $t_0$ and ends at time $t_1$, the controller 170 first loads the processing A program into the processing section (1) 110-1 and processing section (2) 110-2 ($t_1$ through $t_2$). Subsequently, the controller 170 transfers the first half of the preprocessed image data (divided data 1) of the data memory 150 to the processing section (1) 110-1, and the second half (divided data 2) to the processing section (2) 110-2. The processing section (1) 110-1 executes the processing A on the divided data 1 and writes thus obtained data back into the data memory 150, and at the same time the processing section (2) 110-2 likewise executes the processing A on the divided data 2 and writes thus obtained data back into the data memory 150 ($t_2$ through $t_3$).

Next, the controller 170 loads the processing B program into the processing section (1) 110-1 and processing section (2) 110-2 ($t_3$ through $t_4$). Subsequently, the controller 170 transfers the divided data 1, which is the first half of the processed image data obtained after the processing A and stored in the data memory 150, to the processing section (1) 110-1, and the divided data 2, which is the second half, to the processing section (2) 110-2. The processing section (1) 110-1 executes the processing B on the divided data 1 obtained after the processing A and writes thus obtained data back into the data memory 150, and at the same time the processing section (2) 110-2 likewise executes the processing B on the divided data 2 obtained after the processing A and writes thus obtained data back into the data memory 150 ($t_4$ through $t_5$)

Next, the controller 170 loads the processing C program into the processing section (1) 110-1 and processing section (2) 110-2 ($t_5$ through $t_6$). Subsequently, the controller 170 transfers the divided data 1, which is the first half of the processed image data obtained after the processing B and stored in the data memory 150, to the processing section (1) 110-1, and the divided data 2, which is the second half, to the processing section (2) 110-2. The processing section (1) 110-1 executes the processing C on the divided data 1 obtained after the processing B and writes thus obtained data back into the data memory 150, and at the same time the processing section (2) 110-2 likewise executes the processing C on the divided data 2 obtained after the processing B and writes thus obtained data back into the data memory 150 ($t_6$ through $t_7$).

Finally, the controller 170 loads the processing D program into the processing section (1) 110-1 and processing section (2) 110-2 ($t_7$ through $t_8$). Subsequently, the controller 170 transfers the divided data 1, which is the first half of the processed image data obtained after the processing C and stored in the data memory 150, to the processing section (1) 110-1, and the divided data 2, which is the second half, to the processing section (2) 110-2. The processing section (1) 110-1 executes the processing D on the divided data 1 obtained after the processing C and writes thus obtained data back into the data memory 150, and at the same time the processing section (2) 110-2 likewise executes the processing D on the divided data 2 obtained after the processing C and writes thus obtained data back into the data memory 150 ($t_8$ through $t_9$).

Accordingly, all of the processings A through D have been completed on the inputted image data. After the time $t_9$, the controller 170 outputs the processed image data of the data memory 150, which has been subjected to all processings A through D, to the data output section 130.

In the present embodiment, in the case where a plurality of different processings are executed on image data to be processed, and the thus obtained processed image data is outputted, the image data is divided, and the processing section (1) 110-1 and processing section (2) 110-2 can each perform the processings sequentially in parallel on each of thus obtained divided data items, and each of the processing programs can be loaded once, thus the processing performance further improves.

Embodiment 4

Figure 16B:
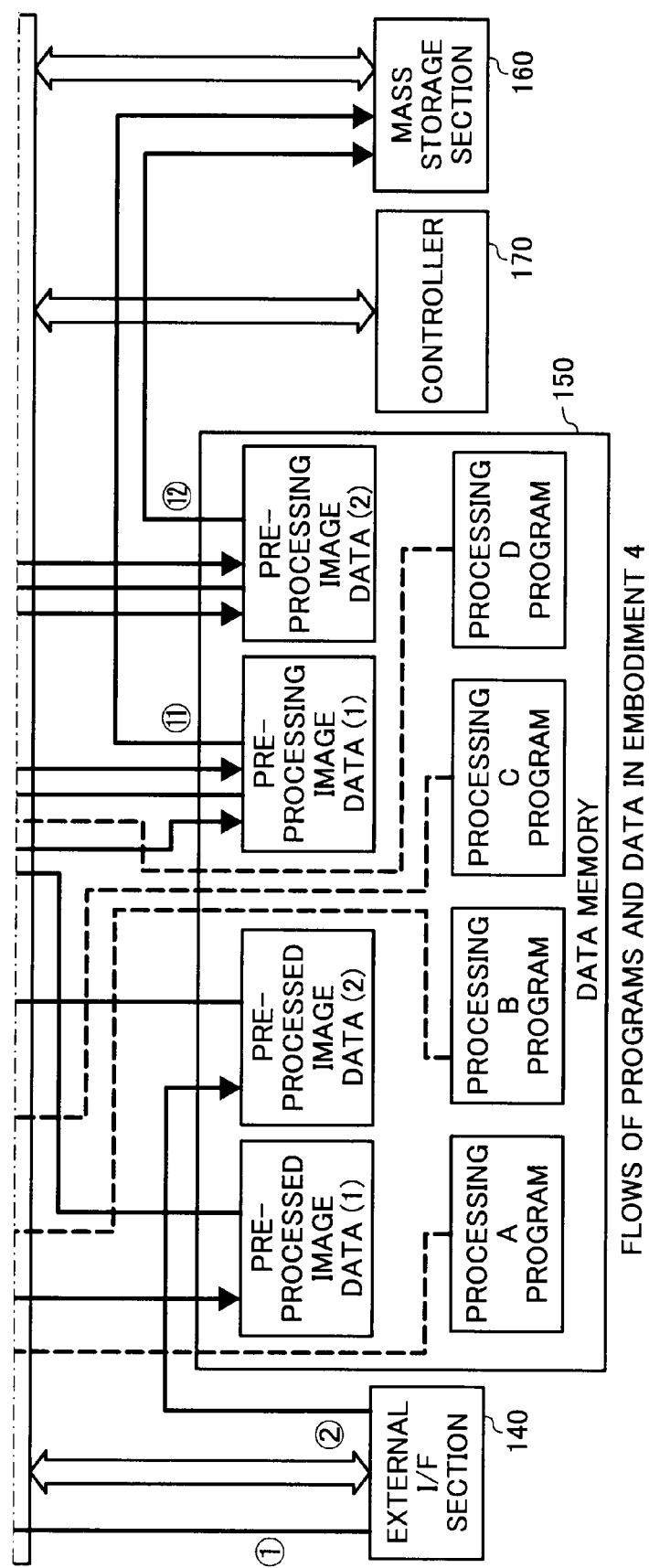
FIG. 16 is a figure showing flows of programs and data according to Embodiment 4 of the present invention.

FIG. 16 shows flows of programs and data according to the present embodiment. In the present embodiment, the processing section (1) 110-1 and processing section (2) 110-2 each execute a plurality of processings in parallel on a plurality of image data items each of which is inputted independently.

As shown in the example of FIG. 16, with regard to an image data item (1) and image data item (2) which are inputted independently from the external I/F section 140, the processing section (1) 110-1 takes charge of the image data item (1), and the processing section (2) 110-2 takes charge of the image data item (2). The processing section (1) 110-1 executes the processing A and processing C on the image data item (1), and the processing section (2) 110-2 executes the processing B and processing D on the image data item (2), the processing sections executing the processing in parallel with each other, and then the processed image data items (1) and (2) are stored in the mass storage section 160.

Hereinafter, the flows of programs and data shown in FIG. 16 are described in detail.

The image data item (1) and image data item (2), which are inputted from the external I/F section 140, are stored into the data memory 150 via the system bus 200. The preprocessed image data item (1) and preprocessed image data item (2) shown in FIG. 16 show such sequence. Here, a notice is issued beforehand from a source of request to inform that the processing A and processing C should be executed on the image data item (1) and the processing B and processing D should be executed on the image data item (2), and the controller 170 already knows about such notice.

The controller 170 first reads out the processing A program and processing B program from the data memory 150, and sends the processing A program to the processing section (1) 110-1 of the data processing section 110 and the processing B program to the processing section (2) 110-2, in the form of DMA via the system bus 200. The processing section (1) 110-1 stores (loads) the sent processing A program into the processing program memory area 111-1, and the processing section (2) 110-2 stores (loads) the sent processing B program into the processing program memory area 111-2.

Next, the controller 170 reads out the image data item (1) to be processed (preprocessed image data item (1)) and image data item (2) to be processed (preprocessed image data item (2)), from the data memory 150, and transfers the image data item (1) to the processing section (1) 110-1 of the data processing section 110 and the image data item (2) to the processing section (2) 110-2, in the form of DMA via the system bus 200. The processing section (1) 110-1 stores the image data item (1) transferred from the data memory 150 into the data memory area 112-1, executes the predetermined processing A on the image data item (1) on the basis of the processing A program inside the processing program memory area 111-1, and writes the image data item (1) obtained after the processing A back into the data memory 150 via the system bus 200. The processed image data item (1) shown in FIG. 16 shows this sequence. In parallel with this processing performed by the processing section (1) 110-1, the processing section (2) 110-2 stores the image data item (2) transferred from the data memory 150 into the data memory area 112-2, executes the predetermined processing B on the image data item (2) on the basis of the processing B program inside the processing program memory area 111-2, and writes the image data item (2) obtained after the processing B back into the data memory 150 via the system bus 200. The processed image data item (2) shown in FIG. 16 shows this sequence.

Once the controller 170 confirms completion of the processing A and processing B performed respectively by the processing section (1) 110-1 and processing section (2) 110-2 by receiving a notice of completion from the processing section (1) 110-1 and processing section (2) 110-2 of the data processing section 110 or by monitoring that the data is written back from the processing section (1) 110-1 and processing section (2) 110-2 into the data memory 150, the controller 170 then reads out the processing C program and processing D program from the data memory 150, and sends the processing C program to the processing section (1) 110-1 of the data processing section 110 and the processing D program to the processing section (2) 110-2, in the form of DMA via the system bus 200. The processing section (1) 110-1 and processing section (2) 110-2 write the sent processing C program and processing D program over the previous processing A program and processing B program, and store thus obtained programs into the processing program memory area 111-1 and processing program memory area 111-2 respectively.

Next, the controller 170 reads out the image data item (1) obtained after the processing A and image data item (2) obtained after the processing B, from the data memory 150, and transfers the image data item (1) obtained after the processing A to the processing section (1) 110-1 of the data processing section 110 and the image data item (2) obtained after the processing B to the processing section (2) 110-2, in the form of DMA via the system bus 200. The processing section (1) 110-1 stores the image data item (1), which is obtained after the processing A and transferred from the data memory 150, into the data memory area 112-1, executes the predetermined processing C on the image data item (1) on the basis of the processing C program inside the processing program memory area 111-1, and writes the image data item (1) obtained after the processing C back into the data memory 150 via the system bus 200. In parallel with this processing performed by the processing section (1) 110-1, the processing section (2) 110-2 stores the image data item (2), which is obtained after the processing B and transferred from the data memory 150, into the data memory area 112-2, executes the predetermined processing D on the image data item (2) on the basis of the processing D program inside the processing program memory area 111-2, and writes the image data item (2) obtained after the processing D back into the data memory 150 via the system bus 200.

In this manner, execution of the processing A and processing C on the image data item (1) and execution of the processing B and processing D on the image data item (2) end. Finally, the controller 170 reads out, from the data memory 150, the processed image data item (1) obtained after the processing A and processing C and the processed image data item (2) obtained after the processing B and processing D, and stores these processed image data items into the mass storage section 160 via the system bus 200. These processed image data items stored in the mass storage section 160 are returned to the source of request under the control of the control CPU 190 or the like in response to, for example, a request or the like sent from the source of request. It should be noted that the processed image data items can be returned from the external I/F section 140 directly to the source of request, without storing them once in the mass storage section 160.

Figure 17B:
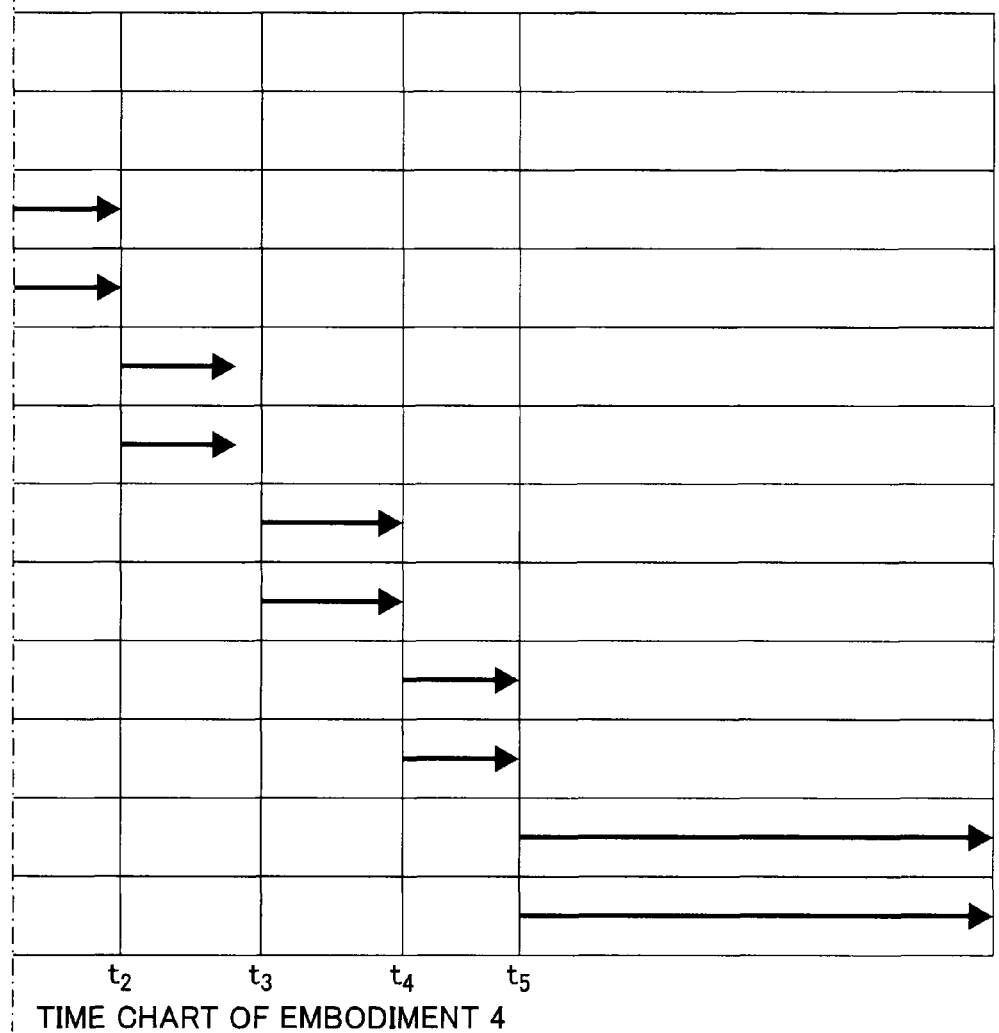
FIG. 17 is a figure showing a time chart of Embodiment 4.

FIG. 17 shows a time chart of the present embodiment. The image data item (1) and image data item (2) are inputted from the external I/F section 140 between time $t_0$ and time $t_1$. The controller 170 first loads the processing A program and processing B program into the processing section (1) 110-1 and processing section (2) 110-2 respectively ($t_1$ through $t_2$). Subsequently, the controller 170 transfers the image data item (1) of the data memory 150 to the processing section (1) 110-1 and the image data item (2) to the processing section (2) 110-2. The processing section (1) 110-1 executes the processing A on the image data item (1) and writes thus obtained image data item back into the data memory 150, and at the same time the processing section (2) 110-2 executes the processing B on the image data item (2) and writes thus obtained image data item back into the data memory 150 ($t_2$ through $t_3$).

Next, the controller 170 loads the processing C program and processing D program into the processing section (1) 110-1 and processing section (2) 110-2 respectively ($t_3$ through $t_4$). Subsequently, the controller 170 transfers the image data item (1), which is of the processed image data in the data memory 150 and obtained after the processing A, to the processing section (1) 110-1, and transfers the image data item (2), which is obtained after the processing B, to the processing section (2) 110-2. The processing section (1) 110-1 executes the processing C on the image data item (1) obtained after the processing A and writes thus obtained image data item back into the data memory 150, and at the same time the processing section (2) 110-2 executes the processing D on the image data item (2) obtained after the processing B and writes thus obtained image data item back into the data memory 150 ($t_4$ through $t_5$) Finally, after time $t_6$, the controller 170 reads out, from the data memory 150, the image data item (1) obtained after the processing A and processing C and the image data item (2) obtained after the processing B and processing D, and stores these image data items into the mass storage section 160.

According to the present embodiment, by using the processing section (1) 110-1 and processing section (2) 110-2, desired processings can be executed in parallel on a plurality of image data items which are inputted independently, thus the processing performance improves.

The above has described the embodiments of the present invention. However, needless to say, the present invention is not limited to these embodiments. Moreover, although there are two processing sections in the data processing section, of course, more processing sections can be provided, and the performance can be further improved by operating these processing sections in parallel.

According to the present invention, the following effects can be achieved.

(1) The programmable data processing section has a plurality of processing sections, and a plurality of processings are executed in parallel by each processing section, thus the memory can be prevented from increasing and the processing performance can be improved, while securing the degree of freedom in programming.

(2) In parallel with simultaneous execution of the plurality of processings, the programs can be processed and loaded in parallel.

(3) A series of processings can be executed in parallel on each section that is obtained by dividing image data to be processed, where by the entire processing time can be reduced.

Various modifications will become possible for those skilled in the art after receiving the teachings of the present disclosure without departing from the scope thereof.

What is claimed is:

1. An image processing apparatus, comprising:
a programmable data processing section;
an image data storage section; and
a processing program storage section storing a plurality of processing programs,
wherein the data processing section comprises a plurality of processing sections in which processings can be performed simultaneously, the number of the plurality of processing sections being less than the number of the plurality of processing programs and
each of the plurality of processing sections repeats the steps of: reading the image data from the image data storage section; reading the processing programs from the processing program storage section; executing the read processing programs in parallel on the read image data; and returning the processed image data to the image data storage section.

2. The image processing apparatus as claimed in claim 1, wherein each of the plurality of processing sections reads mutually different processing programs from the processing program storage section, and executes different processings in parallel on the image data that is read from the image data storage section.

3. The image processing apparatus as claimed in claim 1, wherein each of the plurality of processing sections reads image data to be subjected to different processings, from the processing program storage section, reads the plurality of processing programs from the processing program storage section sequentially, and executes a plurality of processings sequentially on the image data.

4. The image processing apparatus as claimed in claim 1, wherein at least one of the processing sections ("first processing section" hereinafter) transfers the processed image data to another processing section ("second processing section" hereinafter).

5. The image processing apparatus as claimed in claim 4, wherein the second processing section executes a predetermined processing on the image data transferred from the first processing section, and returns the processed image data to the image data storage section, and
after transferring the processed image data to the second processing section, the first processing section, in parallel with the processing performed by the second processing section, reads a subsequent processing program from the processing program storage section, reads the image data processed by the second processing section from the image data storage section, and executes a subsequent processing on the image data.

6. The image processing apparatus as claimed in claim 1, wherein each of the plurality of processing sections divides image data and reads the divided image data items from the image data storage section, reads processing programs that are different from one another from the processing program storage section sequentially, and executes the plurality of processings sequentially on each of the divided image data items.

7. The image processing apparatus as claimed in claim 1, wherein each of the plurality of processing sections divides image data and reads the divided image data items from the image data storage section, reads the same processing programs sequentially from the processing program storage section, and executes the plurality of processings sequentially on each of the divided image data items.

8. The image processing apparatus as claimed in claim 1, further comprising control means for controlling the operation of reading image data from the image data storage section, and the operation of reading a processing program from the processing program storage section, the operations being performed in the plurality of processing sections of the data processing section.

9. An image processing control method for an image processing apparatus which comprises a programmable data processing section having a plurality of processing sections which can perform processings simultaneously, an image data storage section, and a processing program storage section storing a plurality of processing programs, the number of the plurality of processing sections being less than the number of the plurality of processing programs,
wherein each of the plurality of processing sections repeats the steps of:
reading the image data from the image data storage section;
reading the processing programs from the processing program storage section;
executing the read processing programs in parallel on the read image data; and
returning the processed image data to the image data storage section.

10. The image processing control method as claimed in claim 9, wherein each of the plurality of processing sections reads mutually different processing programs from the processing program storage section, and executes different processings in parallel on the image data that is read from the image data storage section.

11. The image processing control method as claimed in claim 9, wherein each of the plurality of processing sections reads image data to be subjected to different processings, from the processing program storage section, reads the plurality of processing programs from the processing program storage section sequentially, and executes a plurality of processings sequentially on the image data.

12. The image processing control method as claimed in claim 9, wherein at least one of the processing sections ("first processing section" hereinafter) transfers the processed image data to another processing section ("second processing section" hereinafter).

13. The image processing control method as claimed in claim 12, wherein the second processing section executes a predetermined processing on the image data transferred from the first processing section, and returns the processed image data to the image data storage section, and
after transferring the processed image data to the second processing section, the first processing section, in parallel with the processing performed by the second processing section, reads a subsequent processing program from the processing program storage section, reads the image data processed by the second processing section from the image data storage section, and executes a subsequent processing on the image data.

14. The image processing control method as claimed in claim 9, wherein each of the plurality of processing sections divides image data and reads the divided image data items from the image data storage section, reads processing programs that are different from one another from the processing program storage section sequentially, and executes the plurality of processings sequentially on each of the divided image data items.

15. The image processing control method as claimed in claim 9, wherein each of the plurality of processing sections divides image data and reads the divided image data items from the image data storage section, reads the same processing programs sequentially from the processing program storage section, and executes the plurality of processings sequentially on each of the divided image data items.

16. An image processing apparatus, comprising:
a data memory for storing image data to be processed and processing programs for executing predetermined processing on the image data;
a first and second processing program memory area for storing the processing programs read out from the data memory;
a first and second data memory area for storing the image data read out from the data memory;
a controller for reading out the processing programs and the image data from the data memory and transferring the processing programs to the first and second processing program memory areas and the image data to the first and second data memory areas; and
a first and second data processing section for executing the predetermined processing on the image data stored in the first and second data memory areas on the basis of the processing programs of the first and second processing program memory areas, wherein
the first and second data processing sections are configured to:
execute a predetermined processing A on the image data read out into the first data memory area on the basis of a processing program A of the first processing program memory area,
execute a predetermined processing B on the image data obtained after the processing A and stored in the second data memory area on the basis of a processing program B of the second processing program memory area, and
write back the image data obtained after the processing B to the data memory; and
the controller is configured to:
confirm completion of the processing performed in the second data memory area and transfer the written back image data to the first data memory area, and
after completion of the processing of the image data on the basis of the processing program A, read out a processing program C to be executed after the processing on the basis on the processing program B and transfer the processing program C to the first processing program memory area.

17. The image processing apparatus as claimed in claim 16, wherein the controller reads out the processing program C after completion of the processing of the image data on the basis of the processing program A and until completion of the processing on the basis of processing program B.

* * * * *